(12) United States Patent
Yang et al.

(10) Patent No.: US 10,568,031 B2
(45) Date of Patent: Feb. 18, 2020

(54) SYSTEM AND METHOD FOR RECOVERING A COMMUNICATIONS STATION IN SLEEP MODE

(71) Applicant: Futurewei Technologies, Inc., Plano, TX (US)

(72) Inventors: Yunsong Yang, San Diego, CA (US); Zhigang Rong, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 15/714,363

(22) Filed: Sep. 25, 2017

(65) Prior Publication Data

US 2018/0242249 A1 Aug. 23, 2018

Related U.S. Application Data

(60) Provisional application No. 62/462,638, filed on Feb. 23, 2017.

(51) Int. Cl.
  *H04W 52/02* (2009.01)
  *H04W 88/08* (2009.01)
  (Continued)

(52) U.S. Cl.
  CPC ... *H04W 52/0229* (2013.01); *H04W 52/0206* (2013.01); *H04W 52/028* (2013.01);
  (Continued)

(58) Field of Classification Search
  CPC ........... H04W 52/0229; H04W 52/028; H04W 52/0216; H04W 52/0206; H04W 48/16;
  (Continued)

(56) References Cited

U.S. PATENT DOCUMENTS 9,232,566 B2 * 1/2016 Amini ............... H04B 1/44
9,713,087 B2 * 7/2017 Asterjadhi ........ H04W 52/0274
(Continued)

FOREIGN PATENT DOCUMENTS

| CN | 101106569 A | 1/2008 |
| CN | 101305624 A | 11/2008 |
| CN | 106464668 A | 2/2017 |

OTHER PUBLICATIONS

Park, et al., "Low-Power Wake-Up Receiver (LP-WUR) for 802.11," IEEE 802.11-15/1307r1, Nov. 10, 2015, 18 pages.
(Continued)

*Primary Examiner* — Brian T O Connor
(74) *Attorney, Agent, or Firm* — Slater Matsil, LLP

(57) ABSTRACT

A method for communications station sleep mode recovery includes a communications station receiving a first wakeup identifier (WUID) from a first access point (AP), and obtaining a second WUID. The method further includes the communications station entering a sleep mode in which a radio communications module (RCM) of the communications station is in a reduced power state, and in which a wakeup receiver of the communications station is in an active state. The method further includes the wakeup receiver of the communications station detecting one of a first wakeup packet (WUP) including the first WUID or a second WUP including the second WUID, while the RCM is in the reduced power state. The method further includes, in response to the detecting, transitioning the RCM from the reduced power state to the active state.

24 Claims, 8 Drawing Sheets

(51) Int. Cl.
  *H04W 48/16* (2009.01)
  *H04L 29/08* (2006.01)
(52) U.S. Cl.
  CPC ....... *H04W 52/0216* (2013.01); *H04L 67/145* (2013.01); *H04W 48/16* (2013.01); *H04W 88/08* (2013.01); *Y02B 70/3233* (2013.01); *Y02D 50/40* (2018.01); *Y02D 70/00* (2018.01); *Y02D 70/1262* (2018.01); *Y02D 70/142* (2018.01); *Y02D 70/144* (2018.01); *Y02D 70/162* (2018.01); *Y02D 70/23* (2018.01); *Y02D 70/26* (2018.01)
(58) Field of Classification Search
  CPC ..... H04W 88/08; H04L 67/145; Y02D 50/40; Y02D 70/26; Y02D 70/162; Y02D 70/142; Y02D 70/00; Y02D 70/144; Y02D 70/1262; Y02D 70/23; Y02B 70/3233
  See application file for complete search history.

(56) References Cited

U.S. PATENT DOCUMENTS

| | | | |
|---|---|---|---|
| 9,942,852 B2* | 4/2018 | Hsu | .................. H04W 52/0258 |
| 2007/0060125 A1 | 3/2007 | Rahim | |
| 2008/0008103 A1 | 1/2008 | Suzuki et al. | |
| 2009/0175449 A1* | 7/2009 | Watanabe | ........... H04L 63/0428 380/272 |
| 2013/0201866 A1 | 8/2013 | Wentink et al. | |
| 2015/0282070 A1 | 10/2015 | Salem et al. | |
| 2016/0219510 A1* | 7/2016 | Asterjadhi | ........ H04W 52/0274 |
| 2016/0219512 A1* | 7/2016 | Asterjadhi | ........ H04W 52/0274 |
| 2016/0270118 A1* | 9/2016 | He | ........................ H04W 74/06 |
| 2017/0041873 A1* | 2/2017 | Wu | .................... H04W 52/0219 |
| 2017/0127347 A1* | 5/2017 | Skeoch | ............. H04W 52/0203 |
| 2017/0201946 A1* | 7/2017 | Hsu | .................... H04W 52/0258 |
| 2017/0311258 A1* | 10/2017 | Asterjadhi | ........ H04W 52/0274 |
| 2017/0339640 A1* | 11/2017 | Krishnamoorthy | .......................... H04W 52/0229 |
| 2017/0359300 A1* | 12/2017 | Patil | .................... H04L 61/1541 |
| 2018/0054783 A1* | 2/2018 | Luo | .................. H04W 72/0493 |
| 2018/0054796 A1* | 2/2018 | Edge | ...................... H04W 4/02 |
| 2018/0192373 A1* | 7/2018 | Fang | ................ H04W 52/0235 |
| 2018/0206193 A1* | 7/2018 | Adachi | ............... H04W 72/0406 |
| 2018/0234318 A1* | 8/2018 | Cox | .................... H04L 43/0823 |
| 2018/0332650 A1* | 11/2018 | Kawasaki | ............... H04W 4/20 |
| 2018/0359791 A1* | 12/2018 | Kawasaki | ............... H04W 8/22 |
| 2019/0021128 A1* | 1/2019 | Sivavakeesar | .......... H04W 4/70 |
| 2019/0158345 A1* | 5/2019 | Lincoln | ............. H04W 52/0274 |
| 2019/0327672 A1* | 10/2019 | Hwang | ............. H04W 52/0206 |

OTHER PUBLICATIONS

Park, et al., "LP-WUR (Low-Power Wake-Up Receiver): Enabling Low-Power and Low-Latency Capability for 802.11," IEEE 802.11-16/0027r0, Jan. 18, 2016, 21 pages.

Park, et al., "LP-WUR (Low-Power Wake Up Receiver) Follow-Up", IEEE 80211-16/0341r0, Mar. 14, 2016, 9 pages.

* cited by examiner

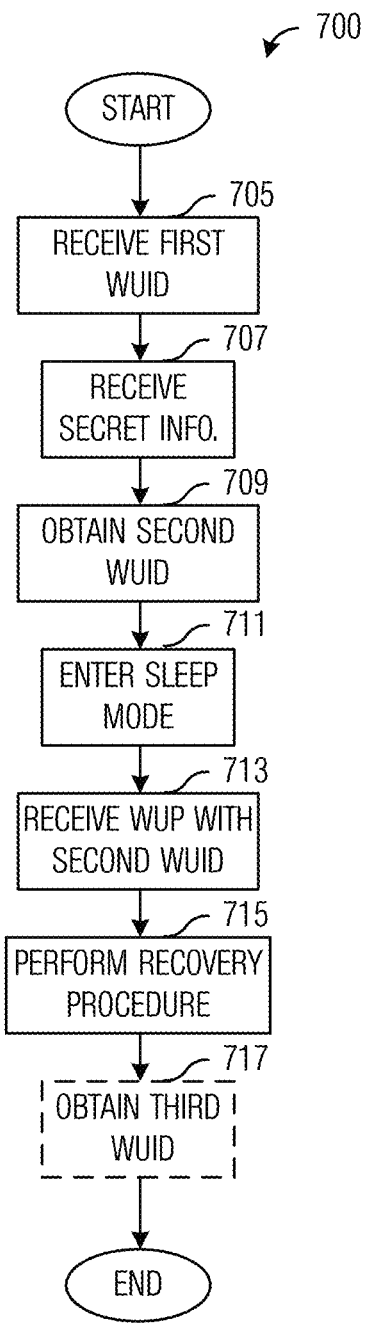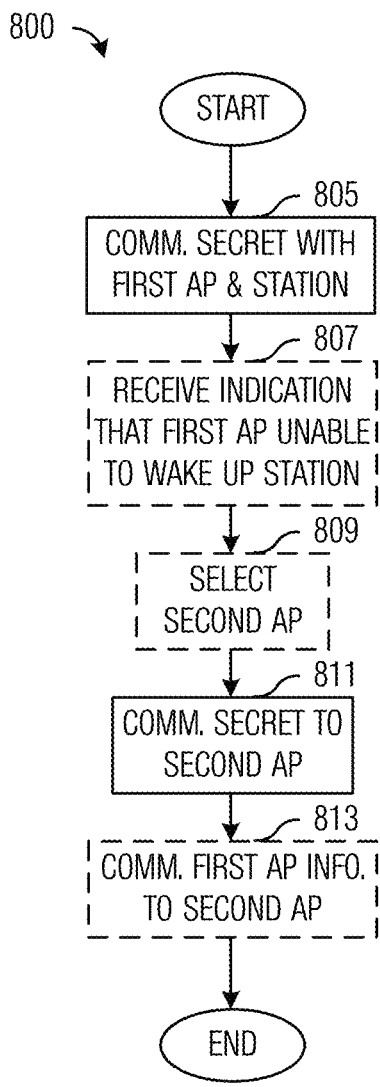
Fig. 7
Fig. 8

SYSTEM AND METHOD FOR RECOVERING A COMMUNICATIONS STATION IN SLEEP MODE

This application claims the benefit of U.S. Provisional Application No. 62/462,638, filed on Feb. 23, 2017, entitled "System and Method for Recovering a Communications Station in Sleep Mode," which application is hereby incorporated herein by reference.

TECHNICAL FIELD

The present disclosure relates generally to a system and method for digital communications, and, in particular embodiments, to a system and method for recovering a communications station in sleep mode.

BACKGROUND

Power consumption is a key consideration in devices that are battery powered. A design criterion for a battery powered device is to minimize power consumption to extend the period of time between battery recharges or replacement as much as possible. In some deployments, such as remotely located sensors, battery replacement may be both impractical as well as expensive. Even in situations where the battery powered device is readily available and recharging is easy, such as in cellular telephones, tablets, laptop computers, wearable devices (WDs), and so on, recharging the battery is still an inconvenient and time consuming task.

Radio communications modules (RCMs), which provide wireless connectivity that is so vital to the operation of these battery powered devices, is also a significant source of power consumption. In general, the more complex the communications and/or greater range supported by the RCM, the greater the power consumption. A reduction in power consumption is realizable by putting one or more RCMs of a battery powered device into sleep (or power off) mode when there is no need of data communications while maintaining a simple, low-power wake-up receiver to receive a wake-up packet. The wake-up packet is transmitted by another device to wake up at least one of the one or more RCMs of the battery powered device in order to resume data communications with the battery powered device. However, if an original access point that put the RCMs to sleep fails or is out of range, it may become difficult and/or impractical to wake up the battery powered device. Therefore, there is a need for systems and methods for recovering the sleeping battery powered device.

SUMMARY

Example embodiments provide a system and method for recovering a communications station in sleep mode.

In accordance with an example embodiment, a method for communications station sleep mode recovery is provided. The method includes receiving, by a communications station, a first wakeup identifier (WUID) from a first access point (AP), obtaining, by the communications station, a second WUID, entering, by the communications station, a sleep mode where a radio communications module (RCM) of the communications station is placed in a reduced power state, wherein a wakeup receiver of the communications station is in an active state when the RCM is in the reduced power state, and detecting, by the wakeup receiver of the communications station, one of a first wakeup packet (WUP) including the first WUID or a second WUP including the second WUID while the RCM is in the reduced power state, and based thereon, transitioning the RCM from the reduced power state to the active state.

Optionally, in any of the preceding embodiments, wherein the method further comprises performing, by the communications station, an association procedure or a re-association procedure with a second AP using the RCM of the communications station upon the wakeup receiver of the communications station detecting the second WUP including the second WUID.

Optionally, in any of the preceding embodiments, wherein the method further comprises receiving, by the communications station, a third WUID from the second AP to replace the first WUID after performing the association procedure or the re-association procedure with the second AP.

Optionally, in any of the preceding embodiments, wherein the method further comprises performing, by the communications station, a scanning procedure to discover the second AP before performing the association procedure or the re-association procedure with the second AP, and performing, by the communications station, an authentication procedure with the second AP after performing the association procedure or the re-association procedure with the second AP.

Optionally, in any of the preceding embodiments, wherein obtaining the second WUID comprises receiving, by the RCM of the communications station, the second WUID from the first AP prior to placing the RCM of the communications station in the reduced power state.

Optionally, in any of the preceding embodiments, wherein obtaining the second WUID comprises receiving, by the RCM of the communications station, a secret information from the first AP, and generating, by the communications station, the second WUID in accordance with the secret information prior to placing the RCM of the communications station in the reduced power state.

Optionally, in any of the preceding embodiments, wherein generating the second WUID comprises applying a hash function to a combination of the secret information and an identifier of the communications station.

Optionally, in any of the preceding embodiments, wherein generating the second WUID comprises applying a hash function to a combination of the secret information, an identifier of the communications station, and an identifier of the first AP.

Optionally, in any of the preceding embodiments, wherein entering the sleep mode further comprises configuring, by the communications station, the wakeup receiver to initially detect for the first WUP and to subsequently detect for both the first WUP and the second WUP after failing to detect the first WUP during a specified period of time.

In accordance with an example embodiment, a method for communications station sleep mode recovery is provided. The method includes configuring, by a server, a first AP to communicate a secret information to a communications station, and detecting, by the server, that the first AP is unable to wake up the communications station, and based thereon configuring, by the server, a second AP with the secret information to wake up the communications station.

Optionally, in any of the preceding embodiments, wherein the method further comprises receiving, by the server, an indication that the first AP is unable to wake up the communications station.

Optionally, in any of the preceding embodiments, wherein the method further comprises selecting, by the server, the second AP from a group of access points.

Optionally, in any of the preceding embodiments, wherein the method further comprises providing, by the server, the second AP with one or more of an identifier of the first AP, information regarding an operating band and channel of the first AP, and an identifier of the communications station.

In accordance with an example embodiment, a communications station is provided. The communications station includes one or more processors, and a computer readable storage medium storing programming for execution by the one or more processors. The programming including instructions to configure the communications station to receive a first WUID from a first AP, obtain a second WUID, enter a sleep mode where a RCM of the communications station is placed in a reduced power state, wherein a wakeup receiver of the communications station is in an active state when the RCM is in the reduced power state, and detect one of a first WUP including the first WUID or a second WUP including the second WUID while the RCM is in the reduced power state, and based thereon, transition the RCM from the reduced power state to the active state.

Optionally, in any of the preceding embodiments, wherein the programming includes instructions to configure the communications station to perform an association procedure or a re-association procedure with a second AP using the RCM of the communications station upon the wakeup receiver of the communications station detecting the second WUP including the second WUID.

Optionally, in any of the preceding embodiments, wherein the programming includes instructions to configure the communications station to receive a third WUID from the second AP to replace the first WUID after performing the association procedure or the re-association procedure with the second AP.

Optionally, in any of the preceding embodiments, wherein the programming includes instructions to configure the communications station to perform a scanning procedure to discover the second AP before performing the association procedure or the re-association procedure with the second AP, and perform an authentication procedure with the second AP after performing the association procedure or the re-association procedure with the second AP.

Optionally, in any of the preceding embodiments, wherein the programming includes instructions to configure the communications station to receive the second WUID from the first AP prior to placing the RCM of the communications station in the reduced power state.

Optionally, in any of the preceding embodiments, wherein the programming includes instructions to configure the communications station to receive a secret information from the first AP, and generate the second WUID in accordance with the secret information prior to placing the RCM of the communications station in the reduced power state.

Optionally, in any of the preceding embodiments, wherein the programming includes instructions to configure the communications station to configure the wakeup receiver to initially detect for the first WUP and to subsequently detect for both the first WUP and the second WUP after failing to detect the first WUP during a specified period of time.

In accordance with an example embodiment, a server is provided. The server includes one or more processors, and a computer readable storage medium storing programming for execution by the one or more processors. The programming including instructions to configure the server to configure a first AP to communicate a secret information to a communications station, and detect that the first AP is unable to wake up the communications station, and based thereon configure a second AP with the secret information to wake up the communications station.

Optionally, in any of the preceding embodiments, wherein the programming includes instructions to configure the server to receive an indication that the first AP is unable to wake up the communications station.

Optionally, in any of the preceding embodiments, wherein the programming includes instructions to configure the server to select the second AP from a group of access points.

Optionally, in any of the preceding embodiments, wherein the programming includes instructions to configure the server to provide the second AP with one or more of an identifier of the first AP, information regarding an operating band and channel of the first AP, and an identifier of the communications station.

In accordance with an example embodiment, a method for communications station sleep mode recovery is provided. The method includes communicating, by a first AP, a secret information to a communications station, configuring, by the first AP, a wakeup receiver of the communications station to wake up a RCM of the communications station in response to detecting a first WUP including a first WUID, configuring, by the first AP, the wakeup receiver of the communications station to wake up the RCM of the communications station in response to detecting a second WUP including a second WUID generated in accordance with the secret information, and placing, by the first AP, the communications station in a sleep mode where the RCM of the communications station is placed in a reduced power state and the wakeup receiver of the communications station is placed in an active state.

Optionally, in any of the preceding embodiments, wherein the method further comprises obtaining, by the first AP, the secret information from a server.

Optionally, in any of the preceding embodiments, wherein the method further comprises indicating, by the first AP, to a server or a second AP that the first AP is unable to wake up the communications station after failing to wake up the communications station.

In accordance with an example embodiment, a method for communications station sleep mode recovery is provided. The method includes obtaining, by a first AP, a secret information associated with a communications station, generating, by the first AP, a WUP including a first WUID generated in accordance with the secret information, transmitting, by the first AP, the WUP, and detecting, by the first AP, a RCM of the communications station is waken up, and based thereon, performing, by the first AP, an association procedure or a re-association procedure with the communications station.

Optionally, in any of the preceding embodiments, wherein the method further comprises transmitting, by the first AP, a second WUID to the communications station after performing the association procedure or the re-association procedure, wherein the second WUID is to be used by the first AP later for waking up the communications station when the first AP has data to send to the communications station.

Optionally, in any of the preceding embodiments, wherein the method further comprises transmitting, by the first AP, a beacon frame or probe response frame to the communications station, and performing, by the first AP, an authentication procedure with the communications station.

Optionally, in any of the preceding embodiments, wherein the method further comprises obtaining, by the first AP, one or more information of an identifier of a second AP, information regarding an operating band and channel of the second AP, or an identifier of the communications station, and using, by the first AP, the one or more information in generating the first WUID and in transmitting the WUP.

Optionally, in any of the preceding embodiments, wherein the secret information and the one or more information are obtained from a server.

Optionally, in any of the preceding embodiments, wherein the secret information and the one or more information are obtained from the second AP.

Practice of the foregoing embodiments enables the waking up of sleeping communications stations by an alternate access point in situations where an original access point that put the communications to sleep has failed and/or is out of range. The waking up of the sleeping communications stations by the alternate access point does not require human intervention, which would be impractical in remote or hard to reach deployments, wherein the alternate access point may not have communicated with the communications stations prior to waking up the communications station.

Practice of the foregoing embodiments also provides security for the sleeping communications stations, preventing malicious attacks on the sleeping communications stations, which could drain the battery of the sleeping communications stations, rendering them inoperable.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 7 illustrates a flow diagram of example operations occurring in a WUR-capable station recovering from sleep mode according to example embodiments described herein;

FIG. 8 illustrates a flow diagram of example operations occurring in a recovery manager supporting WUR-capable station recovery from sleep mode according to example embodiments described herein;

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

The Institute of Electrical and Electronics Engineers (IEEE) Standard 802.11 is a set of media access control (MAC) and physical layer (PHY) specifications for implementing wireless local area network (LAN) or wireless fidelity (Wi-Fi) communications in the 2.4, 5, and 60 GHz frequency bands. A basic service set (BSS) provides the basic building-block of an 802.11 wireless LAN. In an infrastructure mode of 802.11, a single access point (AP) together with all associated stations (STAs) form a BSS. The AP acts as a master to control the STAs within that BSS. A station (STA) may also be referred to as a device, a user equipment, a terminal. An AP may also be referred to as a network controller. The simplest infrastructure BSS consists of one AP and one STA.

Figure 1:
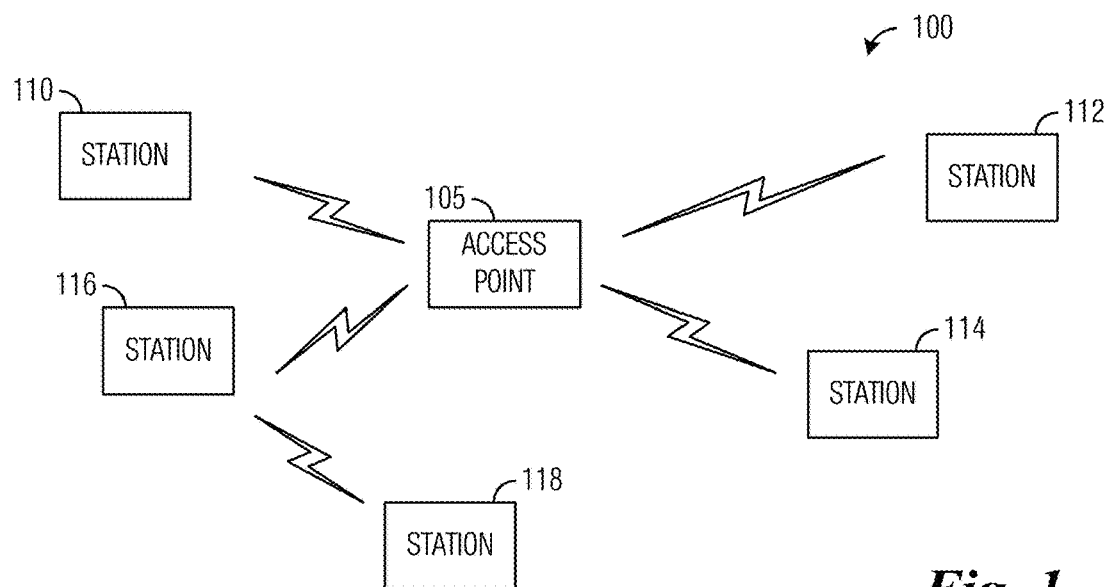
FIG. 1 illustrates an example communications system consisting of an infrastructure basic service set (BSS) according to example embodiments described herein.

FIG. 1 shows an example communications system 100 consisting of an infrastructure BSS. Communications system 100 includes an access point (AP) 105 that is serving a plurality of stations, such as stations 110, 112, 114, 116, and 118. Access point 105 controls certain aspects (such as such as radio frequency channel, transmission power limit, authentication, security, etc.) of communications with or among its associated stations. Generally speaking, in communications system 100, wireless resources for both uplink (station to access point) and downlink (access point to station) transmissions are accessed by transmitters based on a distributed contention mechanism commonly referred to as carrier sensing multiple access with collision avoidance (CSMA/CA). However, access point 105 still may influence the resource allocation by assigning different access priorities to stations and/or traffic types, and when succeeding in channel contention, by explicitly allocating certain time periods for certain stations and/or traffics or for special purposes, such as Quiet Period during which time no transmitter may transmit.

The coverage area of one BSS is limited due to the physics governing radio communications. For some networks such coverage area is sufficient, for other networks, increased coverage area is required. Instead of existing independently, an infrastructure BSS may also form a component of an extended form of network that is built with multiple BSSs. The architectural component used to interconnect infrastructure BSSs is referred to as a distribution system (DS). The DS allows multiple infrastructure BSSs to form a wireless network of arbitrary size and complexity. This type of network is referred to as an extended service set (ESS). An ESS is the union of the infrastructure BSSs sharing a same service set identifier (SSID) and being connected by a DS. The ESS does not include the DS.

Figure 2:
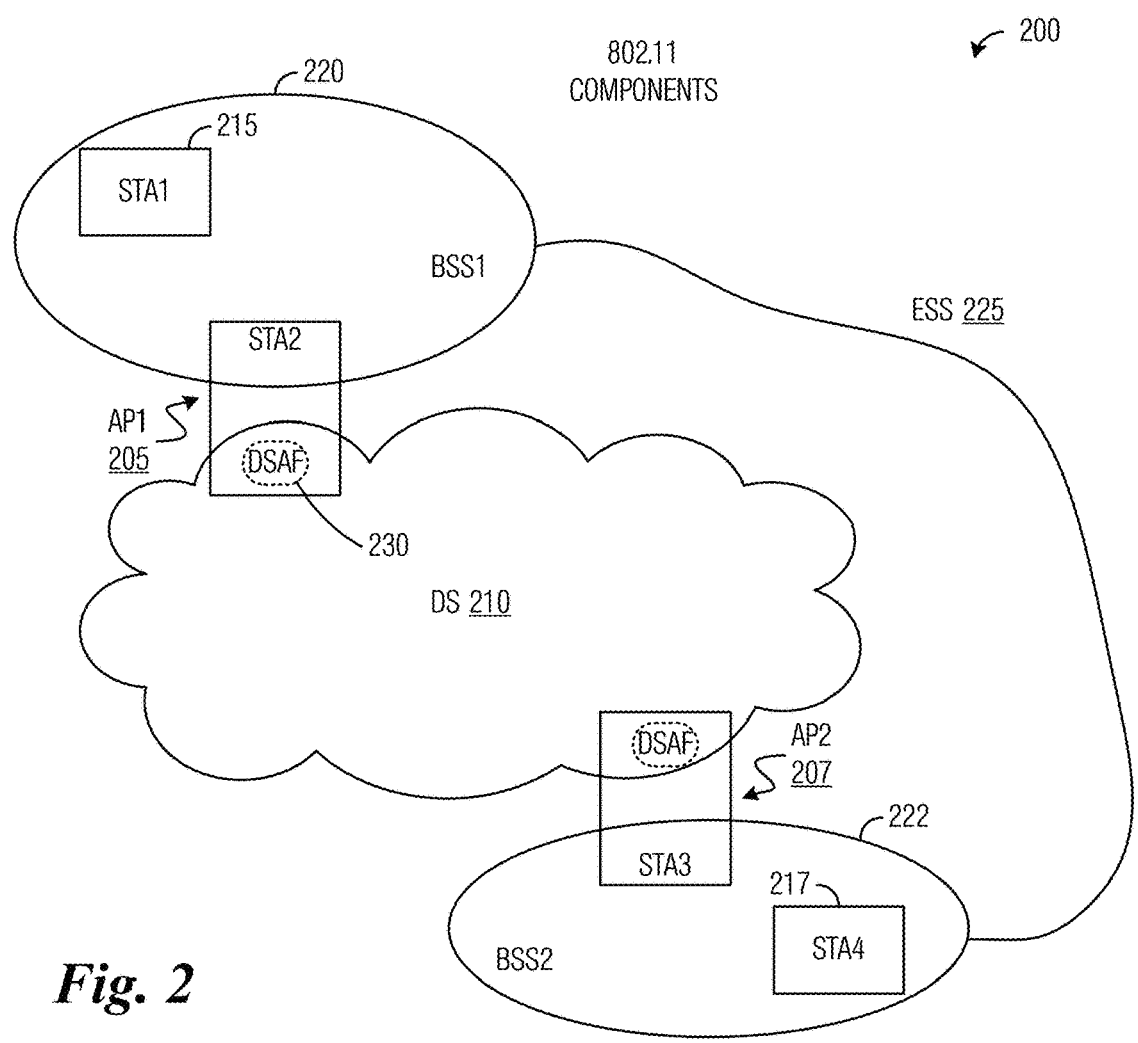
FIG. 2 illustrates an example communications system comprising IEEE 802.11 components.

FIG. 2 illustrates a communications system 200 consisting of an ESS and a DS. Communications system 200 includes a plurality of access points, such as AP1 205 and AP2 207. The access points are coupled together by DS 210. Communications system 200 also includes a plurality of non-AP stations, such as STA1 215 and STA4 217, with STA1 215 being served by AP1 205 and STA4 217 being served by AP2 207. The non-AP stations and their respective serving access point form a basic service set (BSS). As an example, AP1 205 and STA1 215 form BSS 220 and AP2 207 and STA4 217 form BSS 222. The union of BSS 220 and BSS 222 (which are connected by DS 210) form ESS 225. An AP, such as AP1 205 and AP2 207, is often considered as consisting of a station (such as STA2) providing 802.11 radio interface towards the wireless medium plus a DS access function (DSAF) providing an interface towards the DS, such as DS 210. Data moves between a BSS and the DS via the DSAF in an AP. As an example, DSAF 230 is an interface between DS 210 and AP1 205 (and through AP1 205, the entire BSS 220). The DS enables support of mobile devices by providing the logical services necessary to handle address to destination mapping and seamless integration of multiple BSSs.

Figure 3:
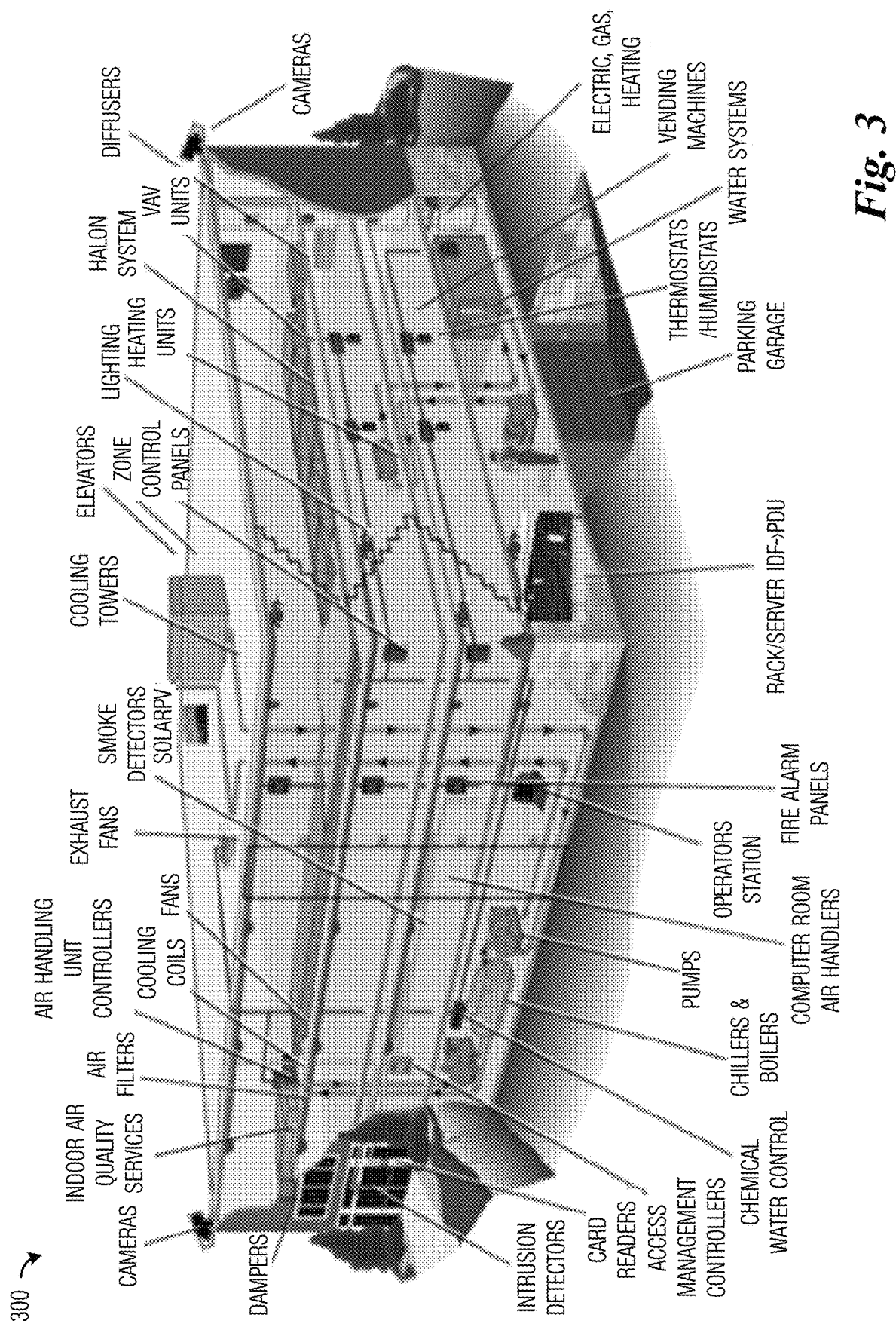
FIG. 3 illustrates an example smart building highlighting various sensors and monitoring devices.

The Internet of Things (IoT) is a suite of technologies and applications that enable devices and locations to generate all kinds of information—and to connect those devices and locations for instant data analysis and, ideally, "smart" actions. For example, the IoT promises to facilitate smart buildings by uniting a variety of sensors and facility equipments into an integrated whole. FIG. 3 illustrates an example smart building 300 highlighting various sensors and monitoring devices, which are deployed in or around a commercial or residential building to monitor various conditions such as lighting, temperature, air quality, fire, smoke, carbon monoxide (CO) gas, security, intrusion, etc., and various facility equipments such as lighting equipments, heating or cooling equipments, air ventilation equipments, fire alarms, sprinkling system, security alarms, information systems, etc., which are deployed to control the various fore-mentioned conditions in order to provide a healthy, comfort, and safe environment for people in the building and to do so in an energy-efficient manner. The various sensors and monitoring devices communicate with the various facility equipments, either directly or via a communications and control center, by using data communications technologies. For example, one or more data access points may be deployed throughout a smart building, where the data access points are connected to a center of communications, data analysis, and control, typically via wired connections such as cables. The data access points are also connected to the various sensors and monitoring devices, as well as communications modules on the various facility equipments, typically via radio communications (such as Wi-Fi, BlueTooth, and ZigBee), so that the various sensors and equipments may be deployed anywhere in the building at a later time without the need to alter the previous cable-wiring. Many of these sensors and the communications modules operate on battery power.

Figure 4:
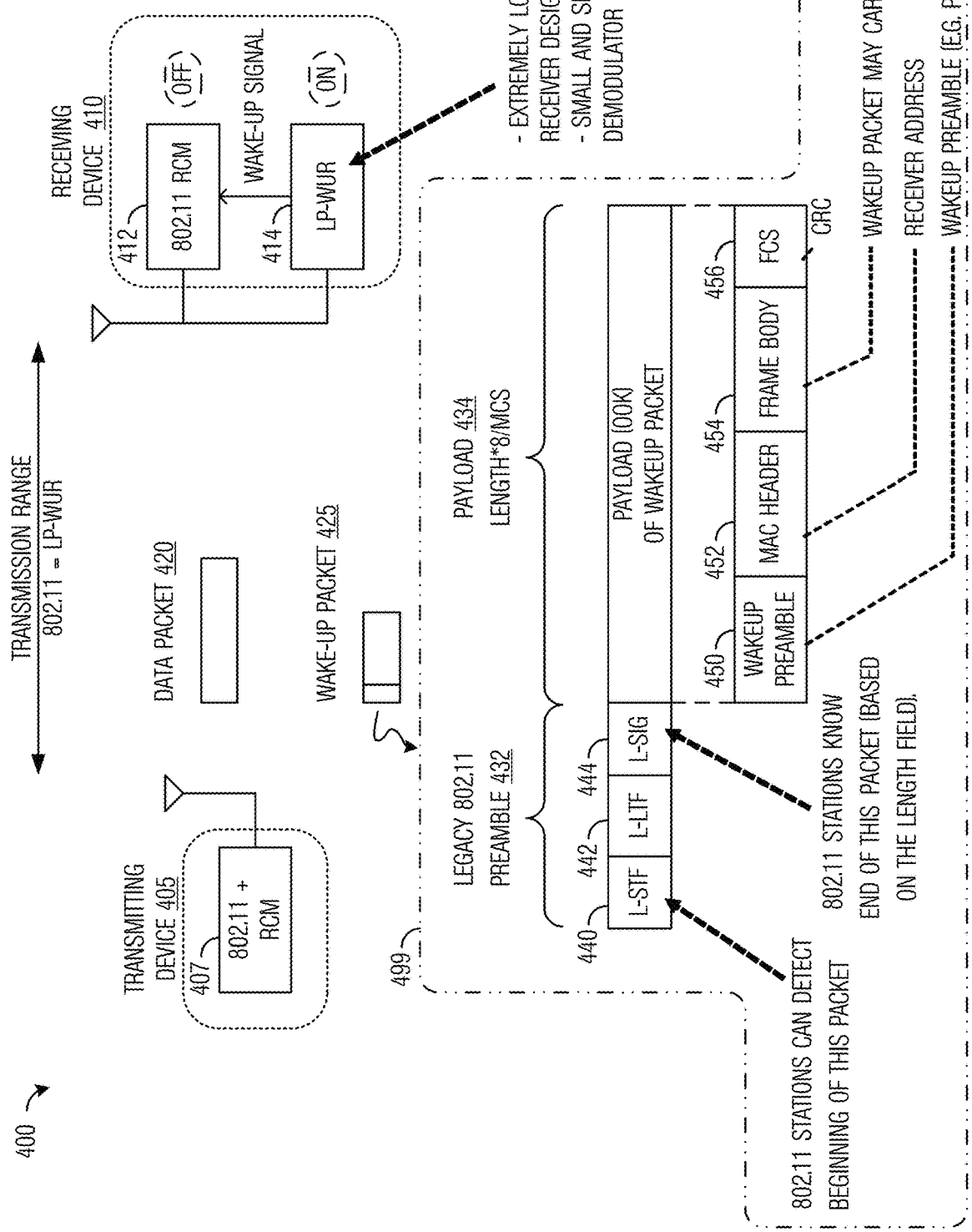
FIG. 4 illustrates an example IEEE 802.11 communications system with a low-power wake-up radio according to example embodiments described herein.

FIG. 4 illustrates an example IEEE 802.11 communications system 400 with a low-power wake-up radio (LP-WUR). Communications system 400 includes a transmitting device 405 and a receiving device 410. Transmitting device 405 includes, among other things, an enhanced 802.11 RCM (labeled "802.11+") 407. Enhanced 802.11 RCM 407 is capable of communications utilizing IEEE 802.11 standard signaling, as well as LP-WUR signaling, including the transmission of a wake-up packet. At least a payload portion of the wake-up packet may be transmitted over a much narrower channel bandwidth than the IEEE 802.11 standard signaling. For example, IEEE 802.11 standard signaling may be transmitted over a channel bandwidth of 20 MHz and the payload of the wake-up packet may be transmitted over a channel bandwidth of 5 MHz or less. A narrower bandwidth helps to reduce the cost and power consumption of an intended receiver, such as one in receiving device 410, which is very desirable for designing a LP-WUR. It is noted that in some places the term LP-WUR refers to the wake-up radio technique as a whole, which comprises a wake-up packet, a first device transmitting the wake-up packet, a receiver of a second device receiving the wake-up packet, and the use of the wake-up packet to wake up an RCM of the second device from a sleep mode. In some other places, LP-WUR just narrowly refers to the receiver of the second device that is configured to receive the wake-up packet. As related to the discussion presented herein, when discussing the wake-up receiver and not the wake-up radio technique as a whole, a special note is made or the word "receiver" is added to WUR.

Receiving device 410 includes, among other things, an 802.11 RCM 412 and a LP-WUR 414, wherein LP-WUR 414 comprises a wake-up receiver of receiving device 410. 802.11 RCM 412 is intended for communicating user data while LP-WUR 414 is not. Thus, LP-WUR 414 usually does not have a transmitter. LP-WUR 414 is present to assist in waking up 802.11 RCM 412 from a sleeping or OFF mode. In general, LP-WUR 414 is ON when 802.11 RCM 412 is OFF (e.g., in the sleeping mode). LP-WUR 414 comprises a memory (or register) designed to store a value provided by a processor associated with 802.11 RCM 412, a receiver designed to receive at least the payload of the wake-up packet, and a comparator designed to compare a value in the received payload with the value stored in the memory. The comparator generates a signal referred to as a wake-up interrupt when the received value matches with the stored value. LP-WUR 414 is coupled to 802.11 RCM 412 through a connection used for carrying the wake-up interrupt, which may be used by LP-WUR 414 to wake up 802.11 RCM 412 from the sleeping mode.

In computer science, an interrupt is a term used for a signal external to a processor that alerts the processor to a high-priority condition or event requiring the interruption of the current program the processor is executing. The processor responds by suspending its current activities and executing programs to deal with the event. The interruption may be temporary, and, after the execution of programs dealing with the event finishes, the processor may resume its current activities. For example, when there is no data communications for a while or when a sleep command is received, a processor associated with 802.11 RCM 412 may execute a program that places at least a major portion of the electronic circuits inside 802.11 RCM 412 into a sleeping mode, which may also be referred to as a power save mode or a power off mode. While the portion of the electronic circuits of 802.11 RCM 412 is in the sleeping mode, the capabilities of 802.11 RCM 412 is disabled to the extent that the 802.11 RCM 412 is no longer capable of communications utilizing IEEE 802.11 standard signaling. The processor associated with 802.11 RCM 412 responds to the wake-up interrupt generated by LP-WUR 414 by powering up the electronic circuits inside 802.11 RCM 412 thereby resuming its capability to communicate utilizing IEEE 802.11 standard signaling. In general, when in the ON or active state, 802.11 RCM 412 will consume significantly greater power than LP-WUR 414, at least one or two orders of magnitude more energy. An example target power consumption for LP-WUR 414 is less than 100 micro-watts while ON. The receiver of LP-WUR 414 has a narrow radio frequency (RF) bandwidth matching the bandwidth of the payload of the wake-up packet, 5 MHz or less than, for example, and has a reception range that is approximately equal to that of 802.11 RCMs.

When performing 802.11 communications, transmitting device 405 transmits data packets, such as data packet 420, to receiving device 410, where 802.11 RCM 412 receives and processes the data packet.

As shown in FIG. 4, receiving device 410 initially is in a reduced power state. One of the ways that receiving device 410 is able to reduce power consumption is to turn OFF 802.11 RCM 412 while keeping LP-WUR 414 ON. When receiving device 410 is in the reduced power state, 802.11 RCM 412 is OFF and receiving device 410 is unable to receive or process 802.11 data packets.

However, LP-WUR 414 remains ON and receiving device 410 is able to receive wake-up packets, such as wake-up packet 425. In a situation where transmitting device 405 has data to transmit to receiving device 410, but receiving device 410 is in the reduced power state, transmitting device 405 first transmits a wake-up packet 425 to receiving device 410, e.g., using 802.11+ RCM 407. Wake-up packet 425 is received and processed by LP-WUR 414, which wakes up 802.11 RCM 412. Then, transmitting device 405 transmits data to receiving device 410 using 802.11+ RCM 407 and receiving device 410 receives the data using 802.11 RCM 412.

A highlight 499 provides a detailed view of an example wake-up packet, e.g., wake-up packet 425. The wake-up packet includes a preamble 432 and a payload 434. Preamble 432 is compliant to 802.11 technical standards and includes a Legacy short training field (L-STF) 440, a Legacy long training field (L-LTF) 442, and a Legacy SIGNAL field (L-SIG) 444. Payload 434 includes multiple fields, including a wake-up preamble 450, a medium access control (MAC) header (e.g., comprising a receiver MAC address or a WUR identifier (WUID) used for identifying the intended recipient) 452, a frame body 454, and a frame check sequence (FCS) 456. Wake-up preamble 450 contains a wake-up sequence. The wake-up sequence may be a pseudo-random number sequence, for example, possessing good auto-correlation properties in order to assist LP-WUR receivers to acquire timing for sampling and detecting the remainder of payload 434. MAC header 452 contains an address or identifier (such as WUID) of a receiving device that wake-up packet 425 is intended to wake up. Frame body 454 may contain other information. FCS 456 includes a cyclic-redundancy check (CRC) for integrity checking wake-up packet 425. In order to maintain compatibility with 802.11 compliant devices in communications system 400, preamble 432 is an 802.11 legacy preamble transmitted over a channel bandwidth complaint with 802.11 standard signaling, such as 20 MHz.

Preamble 432 is not to be detected by the LP-WUR receivers, such as LP-WUR 414, because the receiver bandwidth of LP-WUR is usually insufficient to receive 802.11 legacy preambles, such as preamble 432. Instead, preamble 432 is intended for legacy 802.11 devices to prevent them from transmitting during the transmission of payload 434. A LENGTH subfield of L-SIG 444 in preamble 432 is used to indicate the duration of payload 434. Payload 434 includes information that is modulated using a simple modulation scheme, such as On-Off-Keying (OOK) and is transmitting over a narrower channel bandwidth, such as 5 MHz or less. Therefore, legacy 802.11 devices normally won't be able to detect payload 434. However, legacy 802.11 devices are capable of detecting preamble 432 because preamble 432 fully complies with the bandwidth and signal format of legacy 802.11 standards. Thus, when receiving preamble 432, legacy 802.11 devices recognize that the channel will be busy for at least a duration indicated by the LENGTH value and thereafter suspend their attempts of transmitting during the transmission of payload 434, as if payload 434 complied with IEEE 802.11 standard signaling. It is noted that OOK modulation may be implemented using an OFDM transmitter with relatively minor modification, for example, enhanced 802.11 RCM 407 is not only capable of OFDM modulated communications but also capable of transmitting signals that comply with OOK modulated waveform.

It is noted that, in a situation where a first AP is serving a plurality of WUR-capable stations (including stations in thermometers, motion sensors, fire alarms, medical sensors, weather sensors, automobile status sensors, and so on), it is possible for the first AP to fail while some of these WUR-capable stations are in sleep mode. When in sleep mode, the WUR-capable stations will have their RCMs powered down and their WURs powered up to detect wake-up packets specifically addressed to one or more sleeping stations, the configuration of which was performed by the first AP and the WUR-capable stations.

After the first AP fails, a second AP may be installed to replace the first AP and continue to serve the WUR-capable stations. However, some parameters of the wake-up packets that were configured by the first AP and the WUR-capable stations may have been lost along with the failure of the first AP. Therefore, the second AP may not know the parameters. As an illustrative example, the WUIDs (which are configured for the WUR-capable stations by the first AP and are supposed to be included in the wake-up packets to identify respective individual WUR-capable stations as the intended recipients of the wake-up packets) may not be known to the second AP. Without the parameters, such as the WUIDs, the second AP may be unable to generate specific wake-up packets that the WUR receivers of each of the WUR-capable stations have been uniquely configured to detect. Hence, the second AP may be unable to wake up the WUR-capable stations from the sleep mode. As a result, these WUR-capable stations may permanently remain in the sleep mode, rendering them useless. In some situations, it may be possible to manually reset (e.g., by pressing a reset button) or power-reboot individual WUR-capable stations. However, it is not always feasible or convenient to manually reset or re-boot each WUR-capable station. As an illustrative example, the WUR-capable station may be a light sensor located high on a roof of a building. Therefore, there is a need for a system and method to recover sleeping WUR-capable stations in AP failure situations.

A simple technique may involve broadcasting a universal wake-up packet that wakes up all sleeping WUR-capable stations. However, the use of a universal wake-up packet may open up the system to malicious attackers who falsely and frequently transmit the universal wake-up packet to wake up the WUR-capable stations to drain their battery and eventually disable them. As an example, such a malicious attack can damage a security system that supports universal wake-up packets by disabling remote security sensors.

Although the discussion presented up to now focused the recovery of WUR-capable stations upon failure of the first AP, a similar situation arises when the first AP is no longer within range of the sleeping WUR-capable station(s), this situation is referred to as WUR-capable station roaming. An example of such a situation is when the sleeping WUR-capable station is mobile, such as a package or a package container, and has moved out of range of the first AP due to the WUR-capable station being moved to another part of a warehouse or being en route for delivery. Due to the extended area to cover, Wi-Fi communications with these WUR-capable stations may be provided by an ESS, e.g., one that covers the warehouse, or a community Wi-Fi system comprising APs of households along the delivery route that support a secondary SSID commonly shared within the community. Then, as the WUR-capable station moves, it will move in and out of the coverage area of multiple APs.

In WUR-capable station roaming, a WUR-capable station in a container in a warehouse or en route for delivery may be placed in sleep mode, where an RCM of the WUR-capable station is powered down and a WUR receiver of the WUR-capable station is powered up to detect for a specific wake-up packet in order to wake up the RCM. As the container is moved, the WUR-capable station may leave the coverage of a first AP, which had initially served the WUR-capable station and placed the WUR-capable station in the sleep mode, and arrive at the coverage of a second AP, where the first and second APs belong to the same ESS. As a result of moving, the first AP may become unable to wake up the WUR-capable station from the sleep mode. Furthermore, if the second AP does not know the WUID that the first AP configured for the WUR-capable station, the second AP may be unable to produce the specific wake-up packet that the WUR receiver of the WUR-capable station is configured to detect, thus the second AP may also be unable to wake up the WUR-capable station. Therefore, there is a need for a system and method to recover sleeping WUR-capable stations in WUR-capable station roaming situations.

According to an example embodiment, while a WUR-capable station is being served by a first AP and its RCM is powered on, a recovery manager configures the first AP serving the WUR-capable station to send secret information to the WUR-capable station. The secret information is used by the WUR-capable station to generate a second WUID for the WUR-capable station. However, the second WUID is typically not used by the first AP to wake up the WUR-capable station under normal circumstances. Instead, in normal circumstances, the first AP includes a first WUID, which the first AP previously assigned to the WUR-capable station, in a wake-up packet to wake up the WUR-capable station. The first WUID may also be referred to as a regular WUID, primary WUID, local WUID, or BSS WUID of the WUR-capable station because it is used locally by the first AP, which has placed the WUR-capable station into the sleep mode. The second WUID may also be referred to as a recovery WUID, secondary WUID, global WUID, or ESS WUID of the WUR-capable station because it may be included in a wake-up packet sent by an alternate AP, which may be any AP within the ESS (or any AP other than the first AP that last served the WUR-capable station but has since become unable to wake up the WUR-capable station).

The sharing of the secret information occurs while the first AP is still functioning or while the WUR-capable station is in the coverage of the first AP. The secret information may be a password, a passphrase, a generated sequence (of text and/or numbers, for example), a unique identifier, and so on, assigned to the WUR-capable station. The secret information may be common for all of the WUR-capable stations served by the first AP.

Upon failure of the first AP or when the WUR-capable station leaves the coverage of the first AP, the recovery manager may identify one or more second APs and configure the second AP(s) with the secret information of the WUR-capable station. Optionally, the recover manager also configures the second AP with information regarding the operating band and channel of the first AP (i.e., the operating band and channel where the WUR-capable station expects to receive the wake-up packet). With the information provided by the recovery manager, the second AP is able to generate the second WUID of the WUR-capable station and use the second WUID to wake up the WUR-capable station by transmitting a wake-up packet that includes the second WUID over the operating band and channel that the WUR-capable station is monitoring. After waking up the WUR-capable station, the second AP may perform an association or re-association procedure with the WUR-capable station and configures the WUR-capable station (with a new first WUID, for example) so that the second AP may continue to serve the WUR-capable station. After being informed that the second AP has started to serve the WUR-capable station, the recover manager may configure a new second WUID for the WUR-capable station, via secured signaling messages transmitted by the second AP to the WUR-capable station, so that a malicious attacker won't succeed in a replay attack by replaying the old second WUID of the WUR-capable station, which the malicious attacker may have overheard from the wireless medium. In general, in order to mitigate replay attacks, a serving AP may change the first WUID that the serving AP assigns to a WUR-capable station (for the next wake-up event) after every successful wake-up event. On the other hand, the second WUID is used for recovering the WUR-capable station from being stuck in the sleep mode (after the first AP fails or the WUR-capable station leaves the coverage of the first AP). The second WUID of a WUR-capable station is generally more stable than the first WUID of the WUR-capable station, because the recover manager may need to change the second WUID of the WUR-capable station only after a second AP, which is different from the first AP that had placed the WUR-capable station into the sleep mode, has woken up and started to serve the WUR-capable station.

As related to detecting a specific wake-up packet while in sleep mode, in an embodiment, a WUR-capable station detects for wake-up packets with either the first WUID or the second WUID using its WUR receiver. When the WUR-capable station detects a wake-up packet that includes either the first WUID or the second WUID, the WUR-capable station wakes up a RCM and may optionally put the WUR receiver to sleep. In a situation where the WUR-capable station includes more than one RCM, a variety of techniques may be used to determine which RCM to wake up, including an indication of which RCM to wake up in the wake-up packet, the WUR-capable station and the AP arranging a priori which RCM to wake up, the WUR-capable station selecting which RCM to wake up, and so on. Detailed discussion of techniques for determining which RCM to wake up is presented in co-assigned U.S. patent application Ser. No. 15/648,945, filed on Jul. 13, 2017, entitled "System and Method for Waking Up a Radio Communications Module of a Device," which application is hereby incorporated herein by reference.

In an alternative embodiment, the WUR-capable station performs a multi-stage detection for the first WUID and the second WUID. As an illustrative example, in a first stage, the WUR-capable station initially detects only for the first WUID. After the WUR-capable station fails to receive any wake-up packet including the first WUID for a specified period of time, then the WUR-capable station enters a second stage (e.g., a recovery stage) and detects for any wake-up packet including either the first WUID or the second WUID.

According to an example embodiment, the use of the second WUID (which is generated in accordance with secret information) is allowed at any AP, even APs that are not part of the same ESS as the first AP that configured the WUR-capable station. The recovery manager may configure the secret information (as well as other parameters discussed previously) of the WUR-capable station with other APs to allow for the recovery of the WUR-capable station from the sleep mode, even if the WUR-capable station has moved outside of the coverage of the ESS.

The second WUID may be generated from the secret information in a variety of ways. In a first illustrative example, the second WUID is the secret information. In a second illustrative example, the second WUID is a function of the secret information, wherein the secret information is provided as input to a function and the second WUID is the output of the function. Examples of the function include mathematical functions, logical functions, bit-wise rotations, permutations, cryptographic hash functions, truncation functions, and so forth, or a combination of. Examples of cryptographic hash functions include, but are not limited to, Secure Hash Algorithm 1 (SHA-1), SHA-2 (such as SHA-256, SHA-384, SHA-512), and SHA-3. The output of the function may be truncated to meet size limitations on the second WUID, if there are any. In a third illustrative example, the secret information is combined with other information to generate the second WUID, wherein the other information may be an identifier of the WUR-capable station, an identifier of the first AP, an identifier of a BSS including the first AP, an identifier of an ESS including the first AP, and so on. Examples of the combining of the secret information and the other information includes a concatenation of the secret information and the other information, the secret information and the other information are provided as inputs to a mathematical, logical, rotation, permutation, and so forth, function, etc. In a fourth illustrative example, the secret information is combined with other information to generate the second WUID and the combination of the two is provided as input to a function (as described above, for example) and the second WUID is the output of the function. Other techniques may be used to generate the second WUID from the secret information.

Figure 5A:
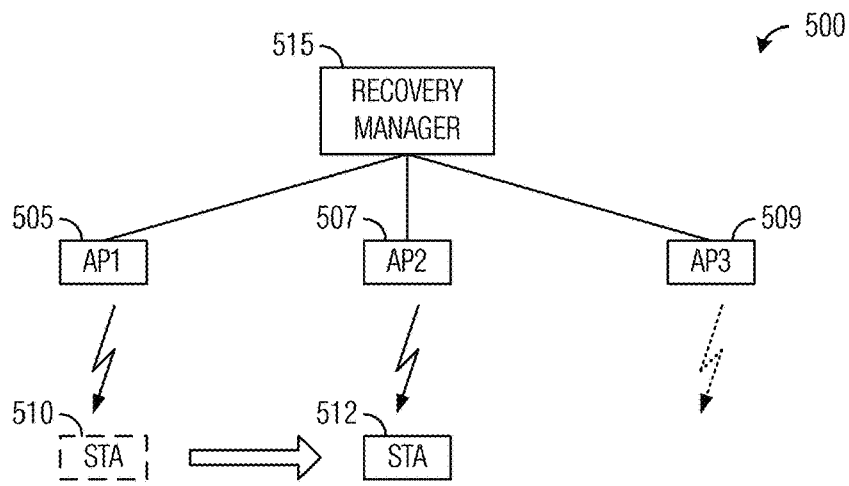
FIG. 5A illustrates an example wireless communications system highlighting an independent recovery manager according to example embodiments described herein.

FIG. 5A illustrates an example wireless communications system 500 highlighting an independent recovery manager. Communications system 500 includes a plurality of APs, such as AP1 505, AP2 507, and AP3 509. Communications system 500 also includes a WUR-capable station "STA" 510. As shown in FIG. 5A, WUR-capable station 510 is mobile and is initially in the coverage of AP1 505, but subsequently leaves the coverage of AP1 505 and into the coverage of AP2 507, where it is shown as WUR-capable station 512 to prevent confusion. Or in an alternative scenario, AP1 505 simply failed and AP2 507 is brought in to replace AP1 505. Communications system 500 further includes a recovery manager 515. Recovery manager 515 is coupled to the plurality of APs, through either wireless or wired connections. Examples of recovery manager 515 may include, but are not limited to, a server, an access controller, and a gateway. Recovery manager 515 configures APs to provide secret information (and potentially other parameters) to the WUR-capable stations that they serve (while the WUR-capable station are not in sleep mode) and instruct each WUR-capable station to generate the second WUID that is usable to help the WUR-capable station recover from the sleep mode should there be a failure of its original serving AP or the WUR-capable station is no longer be in the coverage of its original serving AP. As shown in FIG. 5A, recovery manager 515 is a stand-alone entity in communications system 500. Alternatively, recovery manager 515 may be co-located with another network entity in communications system 500, such as a communications controller, an AP, or so on. Furthermore, recovery manager 515 is shown as being directly connected to the APs. However, in practice, recovery manager 515 may be remotely located with respect to the APs and multiple hops may be located in between recovery manager 515 and the APs. Recovery manager 515 may also be located in different ESSs from a subset of the APs.

Before WUR-capable station 510 is placed into the sleep mode, AP1 505 serves WUR-capable station 510 and provides WUR-capable station 510 with the secret information (and potentially other parameters) and WUR-capable station 510 may generate the second WUID. The secret information (and potentially other parameters such as information of operating frequency band and channel) may be provided by recovery manager 515. Alternatively, AP1 505 generates the secret information (and potentially other parameters as discussed previously) and shares with WUR-capable station 510 and recovery manager 515. AP1 505 may place WUR-capable station 510 into the sleep mode. AP1 505 may fail and be replaced by AP2 507, for example, or WUR-capable station 510 may move (or be moved) out of the coverage of AP 505 and into the coverage of AP2 507. Recovery manager 515 becomes aware that AP1 505 is unable to wake up WUR-capable station 510 and identifies one or more APs (e.g., AP2 507 and AP3 509) and configures the one or more APs with the secret information (and potentially other parameters as discussed previously). As an example, AP2 507 and AP3 509 may be configured by recovery manager 515 to wake up WUR-capable station 510 (which is now WUR-capable station 512 while in the coverage of AP2 507). Recovery manager 515 provides the secret information (and potentially other parameters as discussed previously) to AP2 507 and AP3 509. AP2 507 and AP3 509 uses the secret information to generate the second WUID, which is transmitted in a wake-up packet for identifying WUR-capable station 512 as the intended recipient of the wake-up packet (thus the target of the wake-up and subsequent communications). Because WUR-capable station 512 is in the coverage of AP2 507, the wake-up packet including the second WUID transmitted by AP2 507 is detected by WUR-capable station 512 using its WUR receiver, causing WUR-capable station 512 to wake up. WUR-capable station 512 performs a recovery procedure, which may comprise a procedure (such as a passive or active scanning procedure) to discover AP2 507, an association or re-association procedure with AP2 507, and/or an authentication procedure with AP2 507. AP2 507 configures WUR-capable station 512 and continues to serve WUR-capable station 512 for as long as AP2 507 is operational or as long as WUR-capable station 512 remains in the coverage of AP2 507. Because WUR-capable station 512 is not in the coverage of AP3 509, the wake-up packet including the second WUID transmitted by AP3 509 is not detectable by WUR-capable station 512.

Figure 5B:
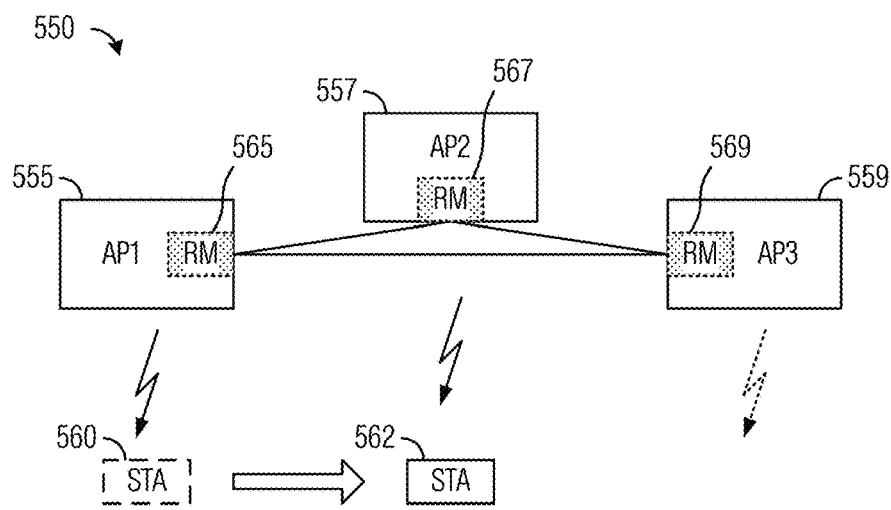
FIG. 5B illustrates an example wireless communications system highlighting a logical recovery manager according to example embodiments described herein.

FIG. 5B illustrates an example wireless communications system 550 highlighting a logical recovery manager. Communications system 550 includes a plurality of APs, such as AP1 555, AP2 557, and AP3 559. Communications system 550 also includes a WUR-capable station "STA" 560. As shown in FIG. 5A, WUR-capable station 560 is mobile and is initially in the coverage of AP1 555, but subsequently leaves the coverage of AP1 555 and into the coverage of AP2 557, where it is shown as WUR-capable station 562 to prevent confusion. Or in an alternative scenario, AP1 555 simply failed and AP2 557 is brought in to replace AP1 555. Communications system 550 includes recovery managers that are implemented logically in network entities of communications system 550 in a distributed manner. As shown in FIG. 5B, each AP includes a recovery manager implemented logically. As illustrative examples, AP1 555 includes recovery manager 565, AP2 557 includes recovery manager 567, and AP3 559 includes recovery manager 569. Although the recovery managers are implemented logically, they function as described in the example embodiments presented herein. As an example, the recovery managers configure the APs in which they are located to provide secret information (and potentially other parameters such as information of operating frequency band and channel) to the WUR-capable stations that they serve. The recovery managers also collaborate with one another to share the secret information, as well as the other parameters. Although each AP is shown as having a logical recovery manager, it is possible that only a subset of the APs will have logical recovery managers. In such a situation, the recovery managers will be responsible for more than one AP. However, the operation of the recovery managers will remain as described herein. In an alternative example embodiment, in addition to the recovery managers in the APs (as shown in FIG. 5B), there may be a centralized recovery manager (either a standalone as shown in FIG. 5A or another logical implementation in another network entity) that coordinates the operation of the various recovery managers.

In regard to the second WUID (i.e., the recovery WUID, secondary WUID, global WUID, or ESS WUID), the second WUID should be of sufficient length in order to prevent a malicious attacker from easily succeeding in a brute-force attack by transmitting wake-up packets with all possible values of second WUIDs. In a first example embodiment, the second WUID is common for all WUR-capable stations served by a single AP. A shared second WUID is particularly useful in a situation where the second AP is replacing the first AP that has failed. The transmission of a single wake-up packet with the shared second WUID would wake up all of the sleeping WUR-capable stations served by the first AP, eliminating the need to separately transmit wake-up packets addressed to each of the WUR-capable stations served by the first AP. In such a situation, the shared second WUID may be the secret information itself, a function of the secret information, or a function of a concatenation of the secret information and an identifier (such as a MAC address) of the first AP. The function may be a hash or cryptographic hash function, for example.

In a second example embodiment, the second WUID for each of the WUR-capable stations served by a single AP is unique. Unique second WUIDs are particularly useful in a situation where a subset of the WUR-capable stations served by the first AP has moved out of the coverage of the first AP and only the WUR-capable stations in the subset of the WUR-capable stations need to be recovered. When the recovery manager identifies the second AP (which may be more than one AP), the recovery manager provides the second AP with the secret information (and optionally other parameters) of the WUR-capable station. The second AP uses the secret information (and optionally other parameters) to generate the second WUID that is unique to the WUR-capable station. The second AP transmits a wake-up packet including the second WUID to wake up the WUR-capable station. The WUR receiver of the WUR-capable station detects for not only a wake-up packet that includes the first WUID of the WUR-capable station, but also for a wake-up packet that includes the second WUID of the WUR-capable station. In this situation, in one example embodiment, the secret information for each WUR-capable station may be a value or identification uniquely created for the WUR-capable station during the manufacturing of the WUR-capable station. Then, this would require the WUR-capable station to provide its secret information to the recovery manager (such as recovery manager 515 or recovery manager 565), after the WUR-capable station establishes a connection with an AP (such as AP1 505 or AP1 555), instead of the opposite way as described before.

On the other hand, in an alternative example embodiment, although each WUR-capable station has a unique second WUID, the secret information for each of the WUR-capable stations does not necessarily need to be different. In practice, it may be practical for the recovery manager to store a single secret information (and potentially other parameters, which may differ for each WUR-capable station) for all of the WUR-capable stations. In order for the WUR-capable stations and the second AP to generate a unique second WUID for each WUR-capable station from the common secret information, the second WUID may be generated as a function of the common secret information and a unique identifier of the WUR-capable station. The function may be a hash function or a cryptographic hash function that is provided a combination (e.g., a concatenation, multiplication, addition, and so on) of the common secret information and the unique identifier (e.g., a media access control (MAC) address) of the WUR-capable station. Additional truncation of the output of the function may be performed to obtain a desired length for the second WUID.

According to an example embodiment, the second WUIDs of a single WUR-capable station under different BSSs of the ESS are different. Unique second WUIDs under different BSSs of a single ESS for a single WUR-capable station enables differentiation of the location of the WUR-capable station based on the BSS of the second AP thereby simplifying the locating of the WUR-capable station, for example. Once again, unique second WUIDs for different BSSs do not require the recovery manager to store different secret information. Common secret information for all WUR-capable stations under all BSSs may simplify implementation. The second WUID may be generated as a function of a combination of the common secret information, a unique identifier of the WUR-capable station, and a unique identifier of the second AP (e.g., a BSS identifier (BSSID) of the second AP, the MAC address of the second AP, and so on).

According to an example embodiment, a wake-up packet type field is included in a wake-up packet to indicate if the wake-up packet is a recovery wake-up packet. If the wake-up packet type field includes a value set to a first value, then the wake-up packet is intended to recover a WUR-capable station whose second WUID matches with the WUID included in the wake-up packet (thereby implying that the WUID in the wake-up packet is a second WUID). If the wake-up packet type field includes a value set to a second value, then the wake-up packet is intended to wake up a WUR-capable station whose first WUID matches with the WUID included in the wake-up packet (thereby implying that the WUID in the wake-up packet is a first WUID). Depending on the wake-up packet type field, the WUR-capable station uses either the first WUID or the second WUID to match with the WUID in the wake-up packet. Alternatively, a WUID type field may be used instead of a wake-up packet type field, wherein a value set to a first value indicates that the WUID included in the wake-up packet is a first WUID and the value set to a second value indicates that the WUID included in the wake-up packet is a second WUID. According to an example embodiment, the WUR-capable station uses both the first WUID and the second WUID to match with the WUID in a received wake-up packet.

Figure 6:
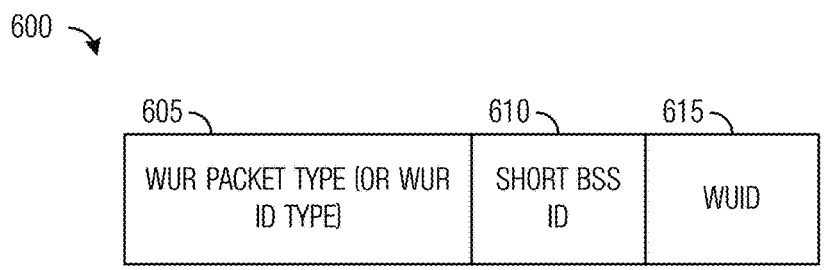
FIG. 6 illustrates an example wake-up packet according to example embodiments described herein.

FIG. 6 illustrates an example wake-up packet 600. As shown in FIG. 6, wake-up packet 600 includes only the MAC header and frame body portions of a typical wake-up packet (such as wake-up packet 425 of FIG. 4) and intentionally omits the legacy preamble, the WUR preamble and FCS portions for simplicity. Wake-up packet 600 includes a wake-up packet type field 605 (or a WUID type field) as described above, a short BSS identifier (ID) field 610 that carries a short form identifier identifying (or at least supposedly identifying) the BSS of the transmitting AP of wake-up packet 600, and a WUID field 615 carrying the WUID (either a first WUID or a second WUID) of a WUR-capable station. Alternatively, the first WUID may be carried in WUID field 615 and the second WUID would be carried in a combination of short BSS ID field 610 and WUID field 615.

As the short BSS ID field may be used by WUR-capable stations to filter out wake-up packets transmitted from un-associated BSS, according to an example embodiment, the recovery manager configures the second AP with additional parameters related to the failed first AP, such as the MAC address of the first AP, to enable the second AP to use the MAC address of the first AP to produce a short BSS ID of the first AP. The second AP may transmit a wake-up packet that includes the short BSS ID of the first AP in order for the WUR receivers of the WUR-capable stations (which are being served or were originally served by the first AP) to further process the remainder of the wake-up packet. According to an alternative example embodiment, if there is an indication (e.g., the wake-up packet type indicator or the WUID type indicator) in the wake-up packet indicating that the WUID in the wake-up packet is a second WUID, the WUR-capable station only checks if its own second WUID is included in the WUID field (or the combination of the short BSS ID and WUID fields) of the wake-up packet. This allows the WUR-capable station to skip the checking if the short BSS ID field matches that of the first AP. Thereby alleviating the need of additional configuration that the recovery manager has to perform on the second AP prior to having the second AP commence operations.

FIG. 7 illustrates a flow diagram of example operations 700 occurring in a WUR-capable station recovering from sleep mode. Operations 700 may be indicative of operations occurring in a WUR-capable station as the WUR-capable station recovers from sleep mode in the event of failure of a first AP or the WUR-capable station having moved out of coverage of the first AP.

Operations 700 begin with the WUR-capable station receiving a first WUID (block 705). The first WUID may be provided by a first AP that configures the WUR-capable station for sleep mode operation. The WUR-capable station receives secret information (and optionally other parameters) (block 707). It should be noted that block 707 may occur before block 705 if the secret information is uniquely created for the WUR-capable station during the manufacturing of the WUR-capable station. The secret information may be used by the WUR-capable station to generate a second WUID, which is used by APs other than the first AP to recover the WUR-capable station from the sleep mode. The secret information may be specific to the WUR-capable station. Alternatively, the secret information is common to all WUR-capable stations served by the first AP. Alternatively, the secret information is common to all WUR-capable stations served by APs of a BSS or an ESS. The WUR-capable station obtains the second WUID (block 709). The second WUID may be generated by the WUR-capable station from the secret information. Alternatively, the second WUID is generated by the first AP and provided to the WUR-capable station. Alternatively, the second WUID is generated from a combination of the secret information and an identifier unique to the WUR-capable station, and the combination is provided to a function. Alternatively, the second WUID is generated from a combination of the secret information, an identifier unique to the WUR-capable station, and an identifier associated with the first AP, and the combination is provided to a function. The function may be a hash or cryptographic hash function, which may be followed by a truncation function.

The WUR-capable station enters the sleep mode (block 711). Entering the sleep mode includes the WUR-capable station turning off (e.g., sleep mode or reduced power state) its one or more RCMs and turning on (e.g., active state) its WUR receiver. The WUR receiver remains on to detect wake-up packets that are specifically addressed to the WUR-capable station, i.e., the wake-up packets include either the first WUID or the second WUID of the WUR-capable station. The WUR-capable station receives a wake-up packet that includes the second WUID (block 713). The WUR-capable station (or more specifically, at least one of the one or more RCMs of the WUR-capable station) is waken up and performs a recovery procedure with the sender of the wake-up packet, i.e., the second AP (block 715). As described before, from a perspective of the WUR-capable station, the recovery procedure may comprise a procedure (such as a passive or active scanning procedure) to discover the second AP, an association or re-association procedure with the second AP, and/or an authentication procedure with the second AP. The WUR-capable station may receive a configuration of a third WUID to replace the first WUID (block 717). The third WUID may be provided by the second AP and replaces the first WUID (which as provided by the first AP) for use in waking up the WUR-capable station under normal circumstances (i.e., while the WUR-capable station is under coverage of the second AP).

FIG. 8 illustrates a flow diagram of example operations 800 occurring in a recovery manager supporting WUR-capable station recovery from sleep mode. Operations 800 may be indicative of operations occurring in a recovery manager supporting WUR-capable station recovery from sleep mode in the event of failure of a first AP or the WUR-capable station having moved out of coverage of the first AP.

Operations 800 begin with the recovery manager communicating secret information (and optionally other parameters) with the first AP and the WUR-capable station (block 805). The secret information may be generated by the recovery manager and provided to the first AP and the WUR-capable station. Alternatively, the secret information may be generated by the first AP and provided to the recovery manager and the WUR-capable station. Yet alternatively, the secret information may be generated for the WUR-capable station during the manufacturing of the WUR-capable station and provided to the recovery manager via the first AP. The secret information may be unique for the WUR-capable station. Alternatively, the secret information is the same for all WUR-capable stations served by the first AP. Alternatively, the secret information is the same for all WUR-capable stations served by APs of a BSS or ESS. The recovery manager may receive an indication that the first AP is unable to wake up the WUR-capable station (block 807). The indication may be received from the first AP, which has tried to wake up the WUR-capable station without success. Alternatively, the indication may be received from another AP, which has detected that the first AP has failed. Alternatively, the indication may be received from an AP that has been installed to replace the first AP. The recovery manager may select one or more second APs (block 809). The recovery manager may select the one or more second APs from APs that are neighbors of the first AP. In an iterative fashion, the recovery manager may select second APs from APs that are located further away from the first AP if second APs previously selected have not been able to wake up the WUR-capable station. The recovery manager communicates the secret information (and potentially other parameters) to the one or more second APs selected (block 811). The secret information enables the one or more second APs to generate the second WUID, allowing the one or more second APs to attempt to wake up the WUR-capable station. The recovery manager may communicate information about the first AP to the one or more second APs selected (block 813). The information about the first AP may help the one or more second APs in attempting to wake up the WUR-capable station. As an illustrative example, the information about the first AP includes information about frequency band(s) and channel(s) used by the first AP for transmitting wake-up packets, which will give the one or more second APs information about which frequency band(s) and channel(s) to transmit the wake-up packets to try to wake up the WUR-capable station.

Figures 9, 10:
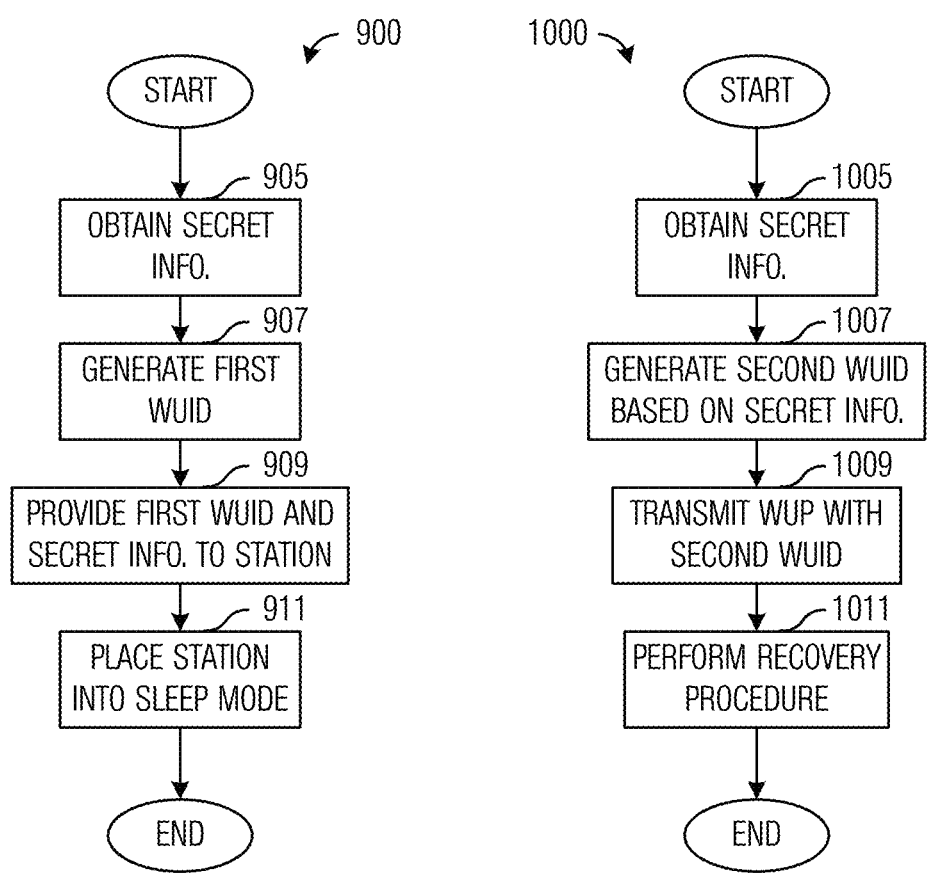
FIG. 9 illustrates a flow diagram of example operations occurring in a first AP supporting WUR-capable station recovery from sleep mode according to example embodiments described herein.
FIG. 10 illustrates a flow diagram of example operations occurring in a second AP supporting WUR-capable station recovery from sleep mode according to example embodiments described herein.

FIG. 9 illustrates a flow diagram of example operations 900 occurring in a first AP supporting WUR-capable station recovery from sleep mode. Operations 900 may be indicative of operations occurring in a first AP that supports WUR-capable station recovery from sleep mode in the event of failure of the first AP or the WUR-capable station having moved out of coverage of the first AP.

Operations 900 begin with the first AP obtaining secret information (and optionally other parameters) for the WUR-capable station (block 905). The secret information may be obtained from the recovery manager. Alternatively, the secret information may be generated by the first AP and provided to the recovery manager. Yet alternatively, the secret information may be obtained from the WUR-capable station. The secret information may be unique to the WUR-capable station, common to all WUR-capable stations served by the first AP, or common to all WUR-capable stations of APs of a BSS or ESS including the first AP. The first AP generates the first WUID for the WUR-capable station (block 907). The first AP provides the first WUID (and the secret information if it is not obtained from the WUR-capable station) to the WUR-capable station (block 909). The first AP places the WUR-capable station to sleep (block 911).

FIG. 10 illustrates a flow diagram of example operations 1000 occurring in a second AP supporting WUR-capable station recovery from sleep mode. Operations 1000 may be indicative of operations occurring in a second AP that supports WUR-capable station recovery from sleep mode in the event of failure of a first AP or the WUR-capable station having moved out of coverage of the first AP.

Operations 1000 begin with the second AP obtaining secret information (and optionally other parameters) for the WUR-capable station (block 1005). The secret information may be obtained from the recovery manager. The secret information may be unique to the WUR-capable station, common to all WUR-capable stations served by the first AP, or common to all WUR-capable stations of APs of a BSS or ESS including the first AP. The second AP generates the second WUID in accordance with the secret information (block 1007). Alternatively, the second WUID is generated by the recover manager and provided to the second AP. Alternatively, the second WUID is generated from a combination of the secret information and an identifier unique to the WUR-capable station, and the combination is provided to a function. Alternatively, the second WUID is generated from a combination of the secret information, an identifier unique to the WUR-capable station, and an identifier associated with the first AP, and the combination is provided to a function. The second AP transmits a wake-up packet (WUP) including the second WUID (block 1009). If the second AP was successful in waking up the WUR-capable station, the second AP performs a recovery procedure with the WUR-capable station (block 1011). From a perspective of the second AP, the recovery procedure may include transmitting a beacon or responding to a probe request in order to assist the WUR-capable station to discover the second AP, performing an association or re-association procedure with the WUR-capable station, and/or performing an authentication procedure with the WUR-capable station. The recovery procedure may also include the assigning of a third WUID to the WUR-capable station by the second AP to replace the first WUID previously assigned to the WUR-capable station by the first AP. The third WUID is to be used in waking up the WUR-capable station under normal circumstances (i.e., while the WUR-capable station is under coverage of the second AP).

Figure 11:
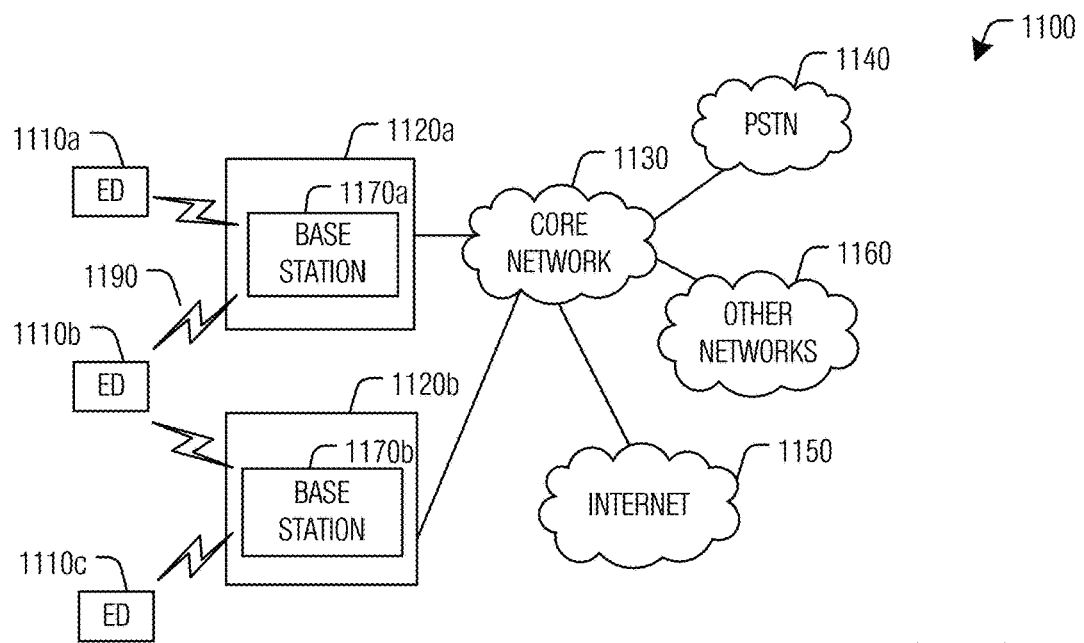
FIG. 11 illustrates an example communication system according to example embodiments described herein.

FIG. 11 illustrates an example communication system 1100. In general, the system 1100 enables multiple wireless or wired users to transmit and receive data and other content. The system 1100 may implement one or more channel access methods, such as code division multiple access (CDMA), time division multiple access (TDMA), frequency division multiple access (FDMA), orthogonal FDMIA (OFDMA), or single-carrier FDMA (SC-FDMA).

In this example, the communication system 1100 includes electronic devices (ED) 111a-1110c, radio access networks (RANs) 1120a-1120b, a core network 1130, a public switched telephone network (PSTN) 1140, the Internet 1150, and other networks 1160. Stations and WUR-capable stations are examples of EDs, and wireless local area networks (WLANs) are examples of RANs. While certain numbers of these components or elements are shown in FIG. 11, any number of these components or elements may be included in the system 1100.

The EDs 1110a-1110c are configured to operate and/or communicate in the system 1100. For example, the EDs 1110a-1110c are configured to transmit and/or receive via wireless or wired communication channels. Each ED 1110a-1110c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 1120a-1120b here include base stations 1170a-1170b, respectively. APs are examples of base stations. Each base station 1170a-1170b is configured to wirelessly interface with one or more of the EDs 1110a-1110c to enable access to the core network 1130, the PSTN 1140, the Internet 1150, and/or the other networks 1160. For example, the base stations 1170a-1170b may include (or be) one or more of several well-known devices, such as a base transceiver station (BTS), a Node-B (NodeB), an evolved NodeB (eNodeB), a Home NodeB, a Home eNodeB, a site controller, an AP, or a wireless router. The EDs 1110a-1110c are configured to interface and communicate with the Internet 1150 and may access the core network 1130, the PSTN 1140, and/or the other networks 1160.

In the embodiment shown in FIG. 11, the base station 1170a forms part of the RAN 1120a, which may include other base stations, elements, and/or devices. Also, the base station 1170b forms part of the RAN 1120b, which may include other base stations, elements, and/or devices. Each base station 1170a-1170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 1170a-1170b communicate with one or more of the EDs 1110a-1110c over one or more air interfaces 1290 using wireless communication links. The air interfaces 1190 may utilize any suitable radio access technology.

It is contemplated that the system 1100 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 1120a-1120b are in communication with the core network 1130 to provide the EDs 1110a-1110c with voice, data, application, Voice over Internet Protocol (VoIP), or other services. Understandably, the RANs 1120a-1120b and/or the core network 1130 may be in direct or indirect communication with one or more other RANs (not shown). The core network 1130 may also serve as a gateway access for other networks (such as the PSTN 1140, the Internet 1150, and the other networks 1160). In addition, some or all of the EDs 1110a-1110c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 1150.

Although FIG. 11 illustrates one example of a communication system, various changes may be made to FIG. 11. For example, the communication system 1100 could include any number of EDs, base stations, networks, or other components in any suitable configuration.

Figure 12A:
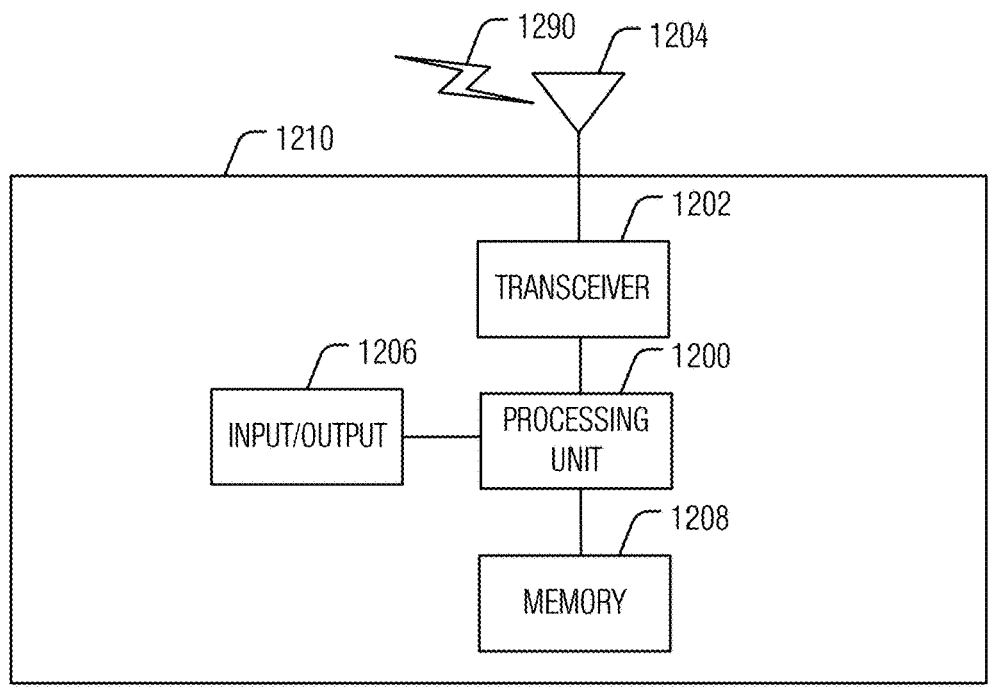
FIGS. 12A and 12B illustrate example devices that may implement the methods and teachings according to this disclosure.
Figure 12B:
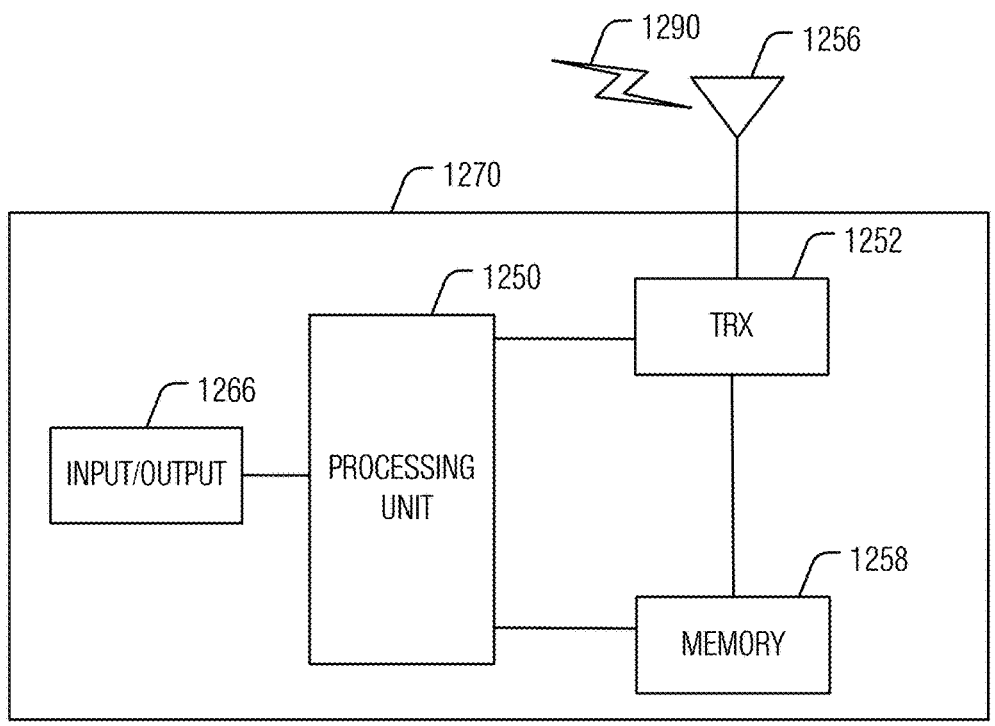

FIGS. 12A and 12B illustrate example devices that may implement the methods and teachings according to this disclosure. In particular, FIG. 12A illustrates an example ED 1210, and FIG. 12B illustrates an example base station 1270. These components could be used in the system 1100 or in any other suitable system.

As shown in FIG. 12A, the ED 1210 includes at least one processing unit 1200. The processing unit 1200 implements various processing operations of the ED 1210. For example, the processing unit 1200 could perform signal coding, data processing, power control, input/output processing, or any other functionality enabling the ED 1210 to operate in the system 1100. The processing unit 1200 also supports the methods and teachings described in more detail above. Each processing unit 1200 includes any suitable processing or computing device configured to perform one or more operations. Each processing unit 1200 could, for example, include a microprocessor, microcontroller, digital signal processor, field programmable gate array, or application specific integrated circuit.

The ED 1210 also includes at least one transceiver 1202. The transceiver 1202 is configured to modulate data or other content for transmission by at least one antenna or NIC (Network Interface Controller) 1204. The transceiver 1202 is also configured to demodulate data or other content received by the at least one antenna 1204. One of the transceivers 1202 is configured to operate as a LP-WUR receiver (i.e., it is configured to receive a wake-up packet addressed to ED 1210 and to wake up another of the transceivers 1202 upon receiving the wake-up packet). Each transceiver 1202 includes any suitable structure for generating signals for wireless or wired transmission and/or processing signals received wirelessly or by wire. Each antenna 1204 includes any suitable structure for transmitting and/or receiving wireless or wired signals. One or multiple transceivers 1202 could be used in the ED 1210, and one or multiple antennas 1204 could be used in the ED 1210. Although shown as a single functional unit, a transceiver 1202 could also be implemented using at least one transmitter and at least one separate receiver.

The ED 1210 further includes one or more input/output devices 1206 or interfaces (such as a wired interface to the Internet 1150). The input/output devices 1206 facilitate interaction with a user or other devices (network communications) in the network. Each input/output device 1206 includes any suitable structure for providing information to or receiving/providing information from a user, such as a speaker, microphone, keypad, keyboard, display, or touch screen, including network interface communications.

In addition, the ED 1210 includes at least one memory 1208. The memory 1208 stores instructions and data used, generated, or collected by the ED 1210. For example, the memory 1208 could store software or firmware instructions executed by the processing unit(s) 1200 and data used to reduce or eliminate interference in incoming signals. Each memory 1208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 12B, the base station 1270 includes at least one processing unit 1350, at least one transceiver 1252, which includes functionality for a transmitter and a receiver, one or more antennas 1256, at least one memory 1258, and one or more input/output devices or interfaces 1266. A scheduler, which would be understood by one skilled in the art, is coupled to the processing unit 1250. The scheduler could be included within or operated separately from the base station 1270. The processing unit 1250 implements various processing operations of the base station 1270, such as signal coding, data processing, power control, input/output processing, or any other functionality. The processing unit 1250 can also support the methods and teachings described in more detail above. Each processing unit 1250 includes any suitable processing or computing device configured to perform one or more operations. Each processing unit 1250 could, for example, include a microprocessor, microcontroller, digital signal processor, field programmable gate array, or application specific integrated circuit.

Each transceiver 1252 includes any suitable structure for generating signals for wireless or wired transmission to one or more EDs or other devices. Each transceiver 1252 further includes any suitable structure for processing signals received wirelessly or by wire from one or more EDs or other devices. Although shown combined as a transceiver 1252, a transmitter and a receiver could be separate components. Each antenna 1256 includes any suitable structure for transmitting and/or receiving wireless or wired signals. While a common antenna 1256 is shown here as being coupled to the transceiver 1252, one or more antennas 1256 could be coupled to the transceiver(s) 1252, allowing separate antennas 1256 to be coupled to the transmitter and the receiver if equipped as separate components. Each memory 1258 includes any suitable volatile and/or non-volatile storage and retrieval device(s). Each input/output device 1266 facilitates interaction with a user or other devices (network communications) in the network. Each input/output device 1266 includes any suitable structure for providing information to or receiving/providing information from a user, including network interface communications.

Figure 13:
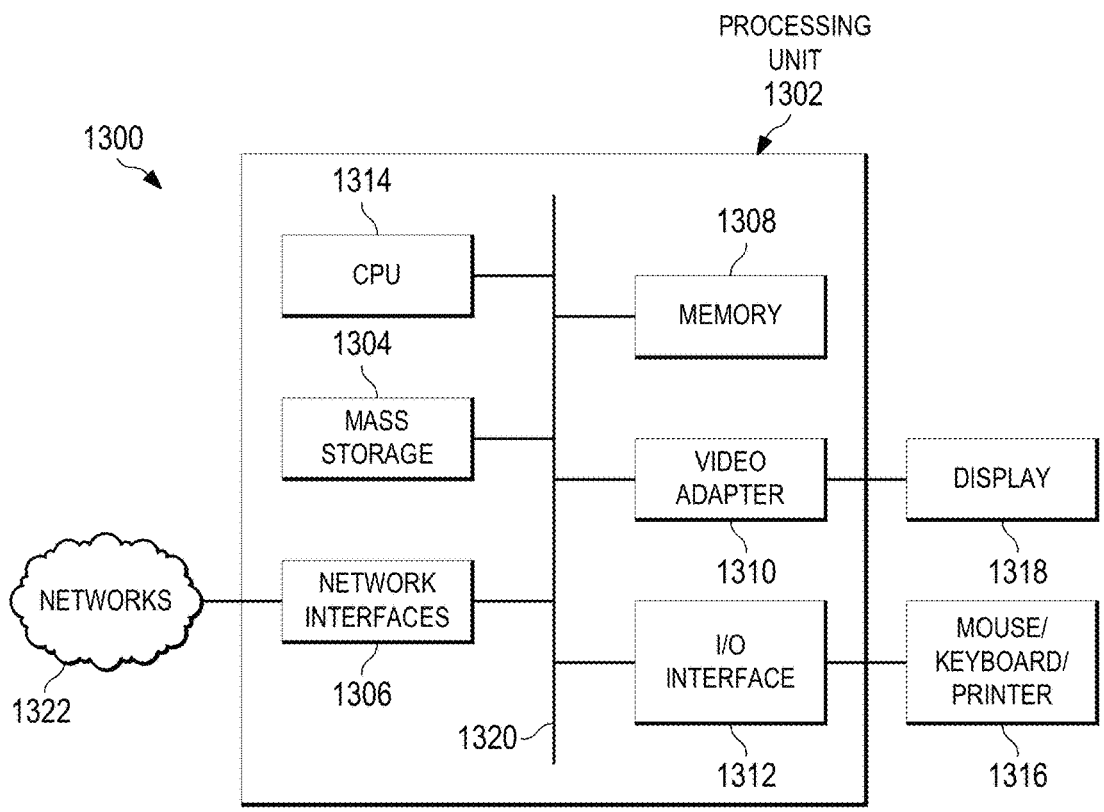
FIG. 13 is a block diagram of a computing system that may be used for implementing the devices and methods disclosed herein.

FIG. 13 is a block diagram of a computing system 1300 that may be used for implementing the devices and methods disclosed herein. For example, the computing system can be any entity of UE, AN, MM, SM, UPGW, AS. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1300 includes a processing unit 1302. The processing unit includes a central processing unit (CPU) 1314, memory 1308, and may further include a mass storage device 1304, a video adapter 1310, and an I/O interface 1312 connected to a bus 1320.

The bus 1320 may be one or more of any type of several bus architectures including a memory bus or memory controller, a peripheral bus, or a video bus. The CPU 1314 may comprise any type of electronic data processor. The memory 1308 may comprise any type of non-transitory system memory such as static random access memory (SRAM), dynamic random access memory (DRAM), synchronous DRAM (SDRAM), read-only memory (ROM), or a combination thereof. In an embodiment, the memory 1308 may include ROM for use at boot-up, and DRAM for program and data storage for use while executing programs.

The mass storage 1304 may comprise any type of non-transitory storage device configured to store data, programs, and other information and to make the data, programs, and other information accessible via the bus 1320. The mass storage 1304 may comprise, for example, one or more of a solid state drive, hard disk drive, a magnetic disk drive, or an optical disk drive.

The video adapter 1310 and the I/O interface 1312 provide interfaces to couple external input and output devices to the processing unit 1302. As illustrated, examples of input and output devices include a display 1318 coupled to the video adapter 1310 and a mouse/keyboard/printer 1316 coupled to the I/O interface 1312. Other devices may be coupled to the processing unit 1302, and additional or fewer interface cards may be utilized. For example, a serial interface such as Universal Serial Bus (USB) (not shown) may be used to provide an interface for an external device.

The processing unit 1302 also includes one or more network interfaces 1306, which may comprise wired links, such as an Ethernet cable, and/or wireless links to access nodes or different networks. The network interfaces 1306 allow the processing unit 1302 to communicate with remote units via the networks. For example, the network interfaces 1306 may provide wireless communication via one or more transmitters/transmit antennas and one or more receivers/receive antennas. In an embodiment, the processing unit 1302 is coupled to a local-area network 1322 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an obtaining unit/module, an entering unit/module, a waking unit/module, a placing unit/module, a performing unit/module, a selecting unit/module, an indicating unit/module, a generating unit/module, a using unit/module, and/or a configuring unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for communications station sleep mode recovery, the method comprising:
    receiving, by a communications station from a first access point (AP), information conveying a first wakeup identifier (WUID) of the communications station, the first WUID for receipt in a first wakeup packet (WUP) from the first AP;
    obtaining, by the communications station, information conveying a second WUID of the communications station, the second WUID for receipt in a second WUP from a second AP, the first and second APs being non-collocated;
    entering, by the communications station, a sleep mode in which a radio communications module (RCM) of the communications station is in a reduced power state, and in which a wakeup receiver of the communications station is in an active state;
    detecting, by the wakeup receiver of the communications station, one of the first WUP including the first WUID from the first AP or the second WUP including the second WUID from the second AP, while the RCM is in the reduced power state; and
    in response to the detecting, transitioning the RCM from the reduced power state to the active state.

2. The method of claim 1, further comprising performing, by the communications station, an association procedure or a re-association procedure with the second AP using the RCM of the communications station upon the wakeup receiver of the communications station detecting the second WUP including the second WUID.

3. The method of claim 2, further comprising receiving, by the communications station, a third WUID from the second AP to replace the first WUID after performing the association procedure or the re-association procedure with the second AP.

4. The method of claim 2, further comprising:
    performing, by the communications station, a scanning procedure to discover the second AP before performing the association procedure or the re-association procedure with the second AP; and performing, by the communications station, an authentication procedure with the second AP after performing the association procedure or the re-association procedure with the second AP.

5. The method of claim 1, wherein obtaining the information conveying the second WUID comprises receiving, by the RCM of the communications station, the second WUID from the first AP prior to placing the RCM of the communications station in the reduced power state.

6. The method of claim 1, wherein obtaining the information conveying the second WUID comprises:
receiving, by the RCM of the communications station, a secret information from the first AP; and
generating, by the communications station, the second WUID in accordance with the secret information prior to placing the RCM of the communications station in the reduced power state.

7. The method of claim 6, wherein generating the second WUID comprises applying a hash function to a combination of the secret information and an identifier of the communications station.

8. The method of claim 6, wherein generating the second WUID comprises applying a hash function to a combination of the secret information, an identifier of the communications station, and an identifier of the first AP.

9. The method of claim 1, wherein entering the sleep mode further comprises configuring, by the communications station, the wakeup receiver to initially detect for the first WUP and to subsequently detect for both the first WUP and the second WUP after failing to detect the first WUP during a specified period of time.

10. A method for communications station sleep mode recovery, the method comprising:
configuring, by a server, a first access point (AP) to communicate a secret information to a communications station, the secret information for use by the first AP to generate a first wakeup identifier (WUID) for waking up the communications station;
detecting, by the server, that the first AP is unable to wake up the communications station; and
in response to the detecting, configuring, by the server, a second AP with the secret information to wake up the communications station, the secret information for use by the second AP to generate a second WUID for waking up the communications station, the second WUID being different from the first WUID.

11. The method of claim 10, further comprising receiving, by the server, an indication that the first AP is unable to wake up the communications station.

12. The method of claim 10, further comprising selecting, by the server, the second AP from a group of access points.

13. The method of claim 10, further comprising providing, by the server, the second AP with one or more of an identifier of the first AP, information regarding an operating band and channel of the first AP, or an identifier of the communications station.

14. A communications station, comprising:
a non-transitory memory storage comprising instructions; and
one or more processors in communication with the non-transitory memory storage, wherein the one or more processors execute the instructions to configure the communications station to:
receive, from a first access point (AP), information conveying a first wakeup identifier (WUID) of the communications station, the first WUID for receipt in a first wakeup packet (WUP) from the first AP,
obtain information conveying a second WUID of the communications station, the second WUID for receipt in a second WUP from a second AP, the first and second APs being non-collocated,
enter a sleep mode in which a radio communications module (RCM) of the communications station is in a reduced power state and in which a wakeup receiver of the communications station is in an active state,
detect one of the first WUP including the first WUID from the first AP or the second WUP including the second WUID from the second AP, while the RCM is in the reduced power state, and
in response to detecting the first or second WUP while the RCM is in the reduced power state, transition the RCM from the reduced power state to the active state.

15. The communications station of claim 14, wherein the one or more processors execute the instructions to configure the communications station to perform an association procedure or a re-association procedure with the second AP using the RCM of the communications station upon the wakeup receiver of the communications station detecting the second WUP including the second WUID.

16. The communications station of claim 15, wherein the one or more processors execute the instructions to configure the communications station to receive a third WUID from the second AP to replace the first WUID after performing the association procedure or the re-association procedure with the second AP.

17. The communications station of claim 15, wherein the one or more processors execute the instructions to configure the communications station to perform a scanning procedure to discover the second AP before performing the association procedure or the re-association procedure with the second AP, and perform an authentication procedure with the second AP after performing the association procedure or the re-association procedure with the second AP.

18. The communications station of claim 14, wherein the one or more processors executing the instructions to configure the communications station to obtain the information conveying the second WUID comprises:
the one or more processors executing the instructions to configure the communications station to receive the second WUID from the first AP prior to placing the RCM of the communications station in the reduced power state.

19. The communications station of claim 14, wherein the one or more processors executing the instructions to configure the communications station to obtain the information conveying the second WUID comprises:
the one or more processors executing the instructions to configure the communications station to receive a secret information from the first AP, and generate the second WUID in accordance with the secret information prior to placing the RCM of the communications station in the reduced power state.

20. The communications station of claim 14, wherein the one or more processors execute the instructions to configure the communications station to configure the wakeup receiver to initially detect for the first WUP, and to subsequently detect for both the first WUP and the second WUP after failing to detect the first WUP during a specified period of time.

21. A server comprising:
a non-transitory memory storage comprising instructions; and one or more processors in communication with the non-transitory memory storage, wherein the one or more processors execute the instructions to configure the server to:

configure a first access point (AP) to communicate a secret information to a communications station, the secret information for use by the first AP to generate a first wakeup identifier (WUID) for waking up the communications station, detect that the first AP is unable to wake up the communications station, and in response to detecting that the first AP is unable to wake the communications station, configure a second AP with the secret information to wake up the communications station, the secret information for use by the second AP to generate a second WUID for waking up the communications station, wherein the second WUID is different from the first WUID.

22. The server of claim 21, wherein the one or more processors execute the instructions to configure the server to receive an indication that the first AP is unable to wake up the communications station.

23. The server of claim 21, wherein the one or more processors execute the instructions to configure the server to select the second AP from a group of access points.

24. The server of claim 21, wherein the one or more processors execute the instructions to configure the server to provide the second AP with one or more of an identifier of the first AP, information regarding an operating band and channel of the first AP, or an identifier of the communications station.

* * * * *